US006912142B2

(12) United States Patent
Keim et al.

(10) Patent No.: US 6,912,142 B2
(45) Date of Patent: Jun. 28, 2005

(54) ALTERNATOR CONTROL CIRCUIT AND RELATED TECHNIQUES

(75) Inventors: Thomas A. Keim, Boxborough, MA (US); David J. Perreault, Brookline, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 191 days.

(21) Appl. No.: 10/086,069

(22) Filed: Oct. 22, 2001

(65) Prior Publication Data

US 2003/0075997 A1 Apr. 24, 2003

Related U.S. Application Data

(63) Continuation-in-part of application No. 09/557,844, filed on Apr. 26, 2000, now Pat. No. 6,346,797, and a continuation-in-part of application No. 09/558,193, filed on Apr. 26, 2000, now Pat. No. 6,456,514.

(60) Provisional application No. 60/242,327, filed on Oct. 20, 2000, provisional application No. 60/177,752, filed on Jan. 24, 2000, and provisional application No. 60/184,006, filed on Feb. 22, 2000.

(51) Int. Cl.[7] .................................................. H02M 5/42

(52) U.S. Cl. .......................................................... 363/89

(58) Field of Search .............................. 363/84, 85, 88, 363/89, 125, 127, 128; 322/28, 29, 36, 37; 318/560, 798–800

(56) References Cited

U.S. PATENT DOCUMENTS

| | | | |
|---|---|---|---|
| 4,507,724 | A | 3/1985 | Glennon |
| 4,701,692 | A | 10/1987 | Takeuchi et al. |
| 4,825,139 | A | 4/1989 | Hamelin et al. |
| 5,151,641 | A | 9/1992 | Shamoto |

(Continued)

FOREIGN PATENT DOCUMENTS

| | | | |
|---|---|---|---|
| DE | 195 19 298 | A1 | 11/1996 |
| EP | 0 493 848 | A2 | 7/1992 |
| EP | 0 693 816 | A1 | 1/1996 |
| EP | 0 778 662 | A1 | 6/1997 |
| EP | 0 849 112 | A1 | 6/1998 |
| WO | WO 98/28832 | | 7/1998 |

OTHER PUBLICATIONS

Search Report for PCT/US01/01669.

Esam Hamid Ismail et al. "Single–Switch 3Ø PWM Low Harmonic Rectifers", IEEE Transactions On Power Electronics. vol. 11 No. 2, Mar. 1996, pp.338–346.

Vahe Caliskan et al. "Analysis of Three–Phase Rectifiers with Constant–Voltage Loads", this paper appears in Power Electronics Specialists Conference, PESC 99. 30$^{th}$ Annual IEEE on pp. 715–720, vol, 2.27 Jun. 27–Jul. 1, 1999.

(Continued)

*Primary Examiner*—Matthew V. Nguyen
(74) *Attorney, Agent, or Firm*—Daly, Crowley, Mofford & Durkee, LLP

(57) ABSTRACT

An alternator system having an alternating current (ac) voltage source includes a switched-mode rectifier (SMR) coupled to the ac voltage source and having an output port coupled to an output of the alternator system, and a controller coupled to said switched-mode rectifier so as to provide a controlled pulse sequence synchronized with an angular rotor position of the (ac) voltage source to activate and deactivate the switched-mode rectifier. The controller further includes a PWM generator having a first input to receive a total duty ratio signal synchronized with an angular rotor position of the (ac) voltage source. The switched mode rectifiers are controlled to increase power output levels at lower speeds near idle. The controller combines improved idle speed power output levels with load matching improvements from PWM control for more efficient operation when compared to circuits using conventional control or PWM load matching control alone.

41 Claims, 18 Drawing Sheets

U.S. PATENT DOCUMENTS

| | | | | |
|---|---|---|---|---|
| 5,170,310 | A | | 12/1992 | Studtmann et al. |
| 5,177,677 | A | | 1/1993 | Nakata et al. |
| 5,248,935 | A | | 9/1993 | Fukuda |
| 5,256,959 | A | | 10/1993 | Nagano et al. |
| 5,319,299 | A | | 6/1994 | Maehara |
| 5,495,162 | A | | 2/1996 | Rozman et al. |
| 5,663,631 | A | | 9/1997 | Kajiura et al. |
| 5,696,430 | A | | 12/1997 | Erdman et al. |
| 5,705,917 | A | | 1/1998 | Scott et al. |
| 5,726,557 | A | | 3/1998 | Umeda et al. |
| 5,731,693 | A | | 3/1998 | Furmanczyk |
| 5,793,625 | A | | 8/1998 | Balogh |
| 5,801,516 | A | | 9/1998 | Rice et al. |
| 5,942,818 | A | | 8/1999 | Satoh et al. |
| 5,946,202 | A | | 8/1999 | Balogh |
| 5,946,203 | A | | 8/1999 | Jiang et al. |
| 5,966,001 | A | | 10/1999 | Maehara et al. |
| 6,031,739 | A | | 2/2000 | He et al. |
| 6,140,803 | A | * | 10/2000 | Hurley et al. ................. 322/29 |
| 6,236,183 | B1 | * | 5/2001 | Schroeder ................... 318/721 |
| 6,249,101 | B1 | * | 6/2001 | Viti et al. ................... 318/560 |
| 6,317,346 | B1 | | 11/2001 | Early |
| 6,650,083 | B2 | * | 11/2003 | Jung .......................... 318/701 |

OTHER PUBLICATIONS

G. Venkataramanan et al. "Variable Speed Operation of Permanent Magnet Alternator Wind Turbines Using a Single Switch Power Convertor", Journal of Solar Energy–Transactions of the Asme vol. 118 No. 4, Nov. 1996, pp. 235–238.

A.R. Prasad et al. "An Active Power Factor Correction Technique for Three–Phase Diode Rectifiers" IEEE Transaction Power Electronics, vol. 6 No. 1 Jan. 1991, pp. 83–92.

* cited by examiner

ALTERNATOR CONTROL CIRCUIT AND RELATED TECHNIQUES

CROSS-REFERENCE TO RELATED APPLICATIONS

This application claims the benefit of U.S. Provisional Application No. 60/242,327, filed on Oct. 20, 2000, which application is hereby incorporated herein by reference in its entirety. This application is a continuation-in-part of application Ser. No. 09/557,844, filed on Apr. 26, 2000, now U.S. Pat. No. 6,346,797, which claims the benefit of Provisional Application No. 60/177,752 filed on Jan. 24, 2000 and U.S. Provisional Application No. 60/184,006 filed on Feb. 22, 2000, which applications are hereby incorporated by reference in their entireties. This application is a continuation-in-part of application Ser. No. 09/558,193, filed on Apr. 26, 2000, now U.S. Pat. No. 6,456,514, which claims the benefit of Provisional Application No. 60/177,752 filed on Jan. 24, 2000 and U.S. Provisional Application No. 60/184,006 filed on Feb. 22, 2000, which applications are hereby incorporated by reference in their entireties.

FIELD OF THE INVENTION

This invention relates generally to alternator systems and more particularly to alternator systems used in vehicles.

BACKGROUND OF THE INVENTION

As is known in the art, an alternator is an alternating current (ac) output generator. To convert the ac voltage to direct current (dc) for use in charging batteries or supplying dc loads, for example, a rectifier system is used. Sometimes, the alternator is referred to as an ac machine or more simply a machine and the combined machine/rectifier system is referred to as an alternator or an alternator system.

In many cases (including automotive alternators), a diode rectifier is used to rectify the ac voltage produced by the generator. The ac machine can be modeled as a three-phase voltage source and a set of inductors.

In a so-called wound-field machine, the output voltage or current can be controlled by varying the current in a field winding which in turn varies the ac voltage magnitudes. The advantage to this approach is the extreme simplicity and low cost of the system. One particular type of wound field machine is a so-called wound-field Lundell-type alternator. A Lundell machine is characterized by the way the rotor/field of the machine is constructed, the details of which are well-known to those of ordinary skill in the art. Significantly, the construction techniques used to manufacture Lundell-type alternators result in an ac machine which is relatively inexpensive but which has a relatively high inductance or reactance. Wound-field Lundell-type alternators are almost universally used in the automotive industry primarily because they are reliable and inexpensive. One problem with wound-field Lundell-type alternators, however, is that the relatively high machine inductance strongly affects the machine performance. In particular, due to the high inductance of the Lundell machine, it exhibits heavy load regulation when used with a diode rectifier. That is, there are significant voltage drops across the machine inductances when current is drawn from the machine, and these drops increase with increasing output current and machine operating speed. Consequently, to deliver substantial current into a low dc output voltage, the ac machine voltage magnitudes have to be much larger than the dc output voltage.

In a typical high-inductance automotive alternator operating at relatively high speed, the internal machine voltage magnitudes are in excess of 80 V to deliver substantial current into a 14 V dc output. This is in contrast with a low-reactance machine with a diode rectifier, in which the dc output voltage is only slightly smaller than the ac voltage magnitudes.

One approach to controlling alternator output voltage is to utilize a field current regulator as shown in FIG. 1A. In this approach, the field current $i_f$ of a machine 10 is determined by a field current regulator 12 which applies a pulse-width modulated voltage across the field winding. The armature of the machine 10 is modeled as a Y-connected set of three-phase back emf voltages $v_{sa}$, $v_{sb}$, and $v_{sc}$ and leakage inductances $L_s$. A fundamental electrical frequency $\omega$ (fundamental electrical cycle) is proportional to the mechanical speed $\omega_m$ and the number of machine poles in the machine 10. For example, the fundamental frequency of an alternator having four machine poles (two pairs of poles) rotating at a frequency of 3600 rpm (60 revolutions per second) would be two times the rotational frequency or 120 cycles per second which is the basic period of the ac voltage generated by the machine 10 prior to rectification.

The magnitude of the back emf voltages is proportional to both frequency and field current. A diode bridge 14 rectifies the ac output of the machine 12 to provide a constant output voltage $V_o$ (perhaps representing a voltage across a battery and associated loads). This simple model captures many of the important characteristics of conventional alternators, while remaining analytically tractable, as described in V. Caliskan, D. J. Perreault, T. M. Jahns and J. G. Kassakian, "Analysis of three-phase rectifiers with constant-voltage loads," IEEE Power Electronics Specialists Conference, Charleston, S.C., June–July 1999, pp. 715–720 and in D. J. Perreault and V. Caliskan, "Automotive Power Generation and Control," LEES Technical Report TR-00-003, Laboratory for Electromagnetic and Electronic Systems, Massachusetts Institute of Technology, Cambridge, Mass., May 24, 2000.

Another approach to controlling output voltage or current is to utilize a controlled rectifier rather than a field current regulator. One simple and often-used approach for controlled rectification is to replace the diodes of a diode rectifier with thyristor devices. For example, as described in J. Schaefer, *Rectifier Circuits, Theory and Design,* New York: Wiley, 1965 and in J. G. Kassakian, M. F. Schlecht, and G. C. Verghese, *Principles of Power Electronics,* New York: Addison-Wesley, 1991, thyristor devices can be used in a semi-bridge converter. With this technique, phase control (i.e. the timing of thyristor turn on with respect to the ac voltage waveform) is used to regulate the output voltage or current. One problem with this approach, however, is that it can be relatively complex from a control point of view. This is especially true when the alternator must provide a constant-voltage output.

Alternatively, rather than using field control or phase control, another approach to controlling output voltage or current is to utilize switched-mode rectification (SMR). With the switched-mode rectification technique, fully-controllable switches are used in a pulse width modulation (PWM) fashion to produce a controlled dc output voltage from the ac input voltage. This approach, which typically utilizes a full-bridge converter circuit, often yields high performance at the expense of having many fully-controlled PWM switches and complex control circuits and techniques.

One relatively simple switched-mode rectifier that has been employed for alternators attached to wind turbines is described in an article entitled "Variable Speed Operation of Permanent Magnet Alternator Wind Turbines Using a Single Switch Power Converter," by G. Venkataramanan, B. Milkovska, V. Gerez, and H. Nehrir, *Journal of Solar Energy Engineering—Transactions of the ASME,* Vol. 118, No. 4, November 1996, pp. 235–238. In this approach, the alternator includes a rectifier comprising a diode bridge followed by a "boost switch set" provided from a controlled switch such as a metal oxide semiconductor field effect transistor (MOSFET) and a diode. The switch is turned on and off at a relatively high frequency in a PWM fashion. This approach is utilized along with PWM switching generated by a current-control loop to simultaneously control the output current and turbine tip speed of a permanent magnet alternator. The approach is specifically applied to a low-reactance (i.e. low-inductance) permanent-magnet ac machine where the battery voltage is higher than the ac voltage waveform. It should be noted that the rectifier system is topologically the same as the Discontinuous Conduction Mode (DCM) rectifier described in an article entitled "An Active Power Factor Correction Technique for Three-Phase Diode Rectifiers," by A. R. Prasad, P. D. Ziogas, and S. Manias, the *IEEE Trans. Power Electronics,* Vol. 6, No. 1, January 1991, pp. 83–92, but the operating mode and control characteristics of the single switch power converter and DCM rectifier are different.

Another controlled rectifier approach for alternators is described in U.S. Pat. No. 5,793,625, entitled "Boost Converter Regulated Alternator," issued Aug. 11, 1998 to Thomas W. Balogh and assigned to Baker Hughes, Inc. The Balogh patent describes a circuit which utilizes boost mode regulator techniques to regulate the output of an ac source with this circuit. The source inductance becomes part of the boost mode circuit, thus avoiding the losses associated with the addition of external inductors. When a three-phase alternator is the power source, the circuit comprises a six diode, three-phase rectifier bridge, three field effect transistors (FETs) and a decoupling capacitor. The three FETs provide a short circuit impedance across the output of the power source to allow storage of energy within the source inductance. During this time, the decoupling capacitor supports the load. When the short circuit is removed, the energy stored in the inductances is delivered to the load. Because the circuit uses the integral magnetics of the ac source to provide the step-up function, a relatively efficient circuit is provided. The duty cycle of the switches (operated together) is used to regulate the alternator output voltage or current. The rectifier can thus be used to regulate the output voltage and improve the current waveforms for low-reactance machines that would otherwise operate with discontinuous phase currents.

While regulating output voltage or current with a boost circuit of this type may be useful in permanent magnet alternators having relatively low inductance characteristics, this method is not useful with alternators having a relatively large inductance characteristic and a wide operating speed range such as in wound-field Lundell-type alternators for automotive applications.

To understand this, consider that in a system which includes an alternator coupled to a boost rectifier, the output voltage is fully controllable by the boost rectifier when the internal machine voltages are the same magnitude or lower than the dc output voltage as described, for example, in the above referenced Venkataramanan paper. However, if the internal machine voltages become significantly larger than the desired dc output voltage, then the output voltage cannot be regulated by the boost rectifier independent of load without inducing unacceptably high currents in the machine. The typical automotive Lundell alternator presents this problem.

At the present, high-reactance Lundell-type alternators with diode rectifiers and field control are widely used in the automotive industry. Moreover, there is a very large infrastructure dedicated to the manufacture of Lundell-type alternators. However, design of these alternators is becoming increasingly more difficult due to continually rising power levels required in vehicles and in particular required in automobiles.

As is also known, the average electrical load in automobiles has been continuously increasing for many years. The increase in electrical load is due to the demand to provide automobiles and other vehicles with increasingly more electronics and power consuming devices such as microprocessors, electric windows and locks, electromechanical valves, and electrical outlets for cell phones, laptop computers and other devices. Such additional electronics results in a need for more electrical energy in automobiles and other vehicles.

Because of this increase in electrical load, higher power demands are being placed on automotive alternator systems. The great demand for increased output power capability from alternators has led to development of improvements over the simpler approaches. One widely-used method for improving the high-speed output power capability of alternators is the introduction of third-harmonic booster diodes.

A system which utilizes this technique is described in conjunction with FIG. 1B in which like elements of FIG. 1A are provided having like reference designations. As illustrated in FIG. 1B, in this technique, the neutral point of the Y-connected stator winding is coupled to the output via a fourth diode leg 18. While the fundamental components of the line-to-neutral back voltages are displaced by 120° in phase, any third harmonic components will be exactly in phase. As a result, third harmonic energy can be drawn from the alternator and transferred to the output by inducing and rectifying common-mode third harmonic currents through the three windings. The booster diodes in leg 18 provide a means for achieving this. In particular, at high speed the combination of the third harmonic voltages at the main rectifier bridge (at nodes a, b, and c in FIG. 1B) combined with the third harmonic of the back voltages are large enough to forward bias the booster diodes and deliver third harmonic energy to the output. In systems with significant (e.g., 10%) third harmonic voltage content, up to 10% additional output power can be delivered at high speed. Additional power is not achieved at low speed (e.g. at idle) using this method, since there is insufficient voltage to forward bias the booster diodes in leg 18.

The output power capability at idle speed is an important characteristic of an automotive alternator, and can be the dominant factor in sizing the alternator. Approaches which can improve the output power capability of an alternator at idle utilizing simple controls are thus of great value.

SUMMARY OF THE INVENTION

In view of the above problems and limitations of existing alternators and alternator control circuits and in accordance with the present invention, the importance of providing improved power output at idle speed has been recognized. It would, therefore, be desirable to provide a means by which the power output capability of an alternator system can be increased. It would also be desirable to improve the output power of alternator systems, particularly at low (e.g., idle)

speeds. It would be further desirable to provide improvements to both diode-rectified and switched-mode rectified alternator systems and to provide an alternator control circuit which provides both improved idle speed power output and relatively high power levels at higher and intermediate speeds and which can be achieved within the existing manufacturing framework and with existing machine sizes at relatively low cost.

In accordance with an aspect of the present invention, an alternator system having an alternating current (ac) voltage source includes a switched-mode rectifier (SMR) coupled to the ac voltage source and having an output port coupled to an output of the alternator system, and a controller coupled to said switched-mode rectifier so as to provide a controlled pulse sequence synchronized with an angular rotor position of the (ac) voltage source to activate and deactivate the switched-mode rectifier. Such an arrangement controls switched mode rectifiers so to increase power output levels at relatively low alternator speeds and in particular at alternator speeds near idle. The inventive controller can combine improved idle speed power output levels with load matching improvements from PWM control for more efficient operation when compared to circuits using conventional control or PWM load matching control alone.

In accordance with a further aspect of the invention, a method for controlling an alternator rectifying circuit includes the steps of sensing an event, waiting a predetermined period of time after the event, generating a start pulse, maintaining the pulse for a predetermined duration and providing the pulse to the alternator rectifying circuit. With this particular arrangement, a technique to improve alternator output power levels near idle speed is provided by controlling the conduction of the rectifying elements by first sensing an event and then providing a pulse to the alternator rectifying circuit, power output levels of the alternator at relatively low alternator speeds can be improved.

In one embodiment, the pulse generation is controlled at a rate based upon fundamental electrical frequency of the ac machine. Optionally, the switched-mode rectifier duty ratio can be controlled as a function of both the alternator speed and the field current magnitude. To achieve maximum power from the machine (at full field current and at high speed) it is sufficient to control the duty ratio as a function of speed. By controlling the duty ratio as a function of both speed and field current and by combining the duty ratio with the idle speed pulse generation, it is possible to achieve improved operation (e.g. higher efficiency) at partial load in addition to the improvement in maximum output power and improved power output levels near idle speed. It should be appreciated that the field current can be determined by any parameter or combination of parameters related to field current, e.g. field current, average field voltage, field controller duty ratio, alternator back emf, field winding magnetic field strength, etc. It should also be appreciated that the controlled pulse sequence can be controlled based on measurements related to the fundamental electrical frequency, such as a given count from a shaft position encoder, a simple reference pulse from a Hall-effect sensor triggered by a magnetic feature on the generator rotor shaft, or any signal which can be used to generate a zero crossing signal of a phase current.

In another embodiment, the alternator system can optionally include a fault protection controller coupled to the SMR controller. The fault protection controller operates under fault conditions (e.g. load dump), and overrides the other controllers in the alternator system based on output voltage when a load dump occurs.

The circuits and methods of the present invention are well suited for use with high-reactance wound-field alternators, including automotive Lundell-type alternators and therefore find immediate applicability in use with automotive alternator systems. The it present invention also finds use in any application which requires an alternator system including but not limited to the petroleum exploration industry, where a downhole alternator, connected to a turbine driven by drilling mud, is used as a downhole power source in directional drilling operations. The invention also finds use in generators for marine and aerospace applications, portable generators, and backup power supplies.

With the present invention, relatively high power levels can be achieved within the existing manufacturing framework and with existing machine sizes at relatively low cost. Furthermore, the so-called load dump problem associated with Lundell and other wound field types of alternators is overcome by the addition of some control circuitry (e.g. a fault protection controller coupled to sense voltage levels at the output or at other locations of the alternator system), a relatively small change in the rectifier stage (e.g. coupling of the rectifier stage to the fault protection controller) and minor adjustments in the machine design so that the peak of the machine's output power versus output voltage curve for constant speed with diode rectification matches the desired output voltage at a desired cruising speed, and the system can additionally produce power output improvements at speeds near idle.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1A:
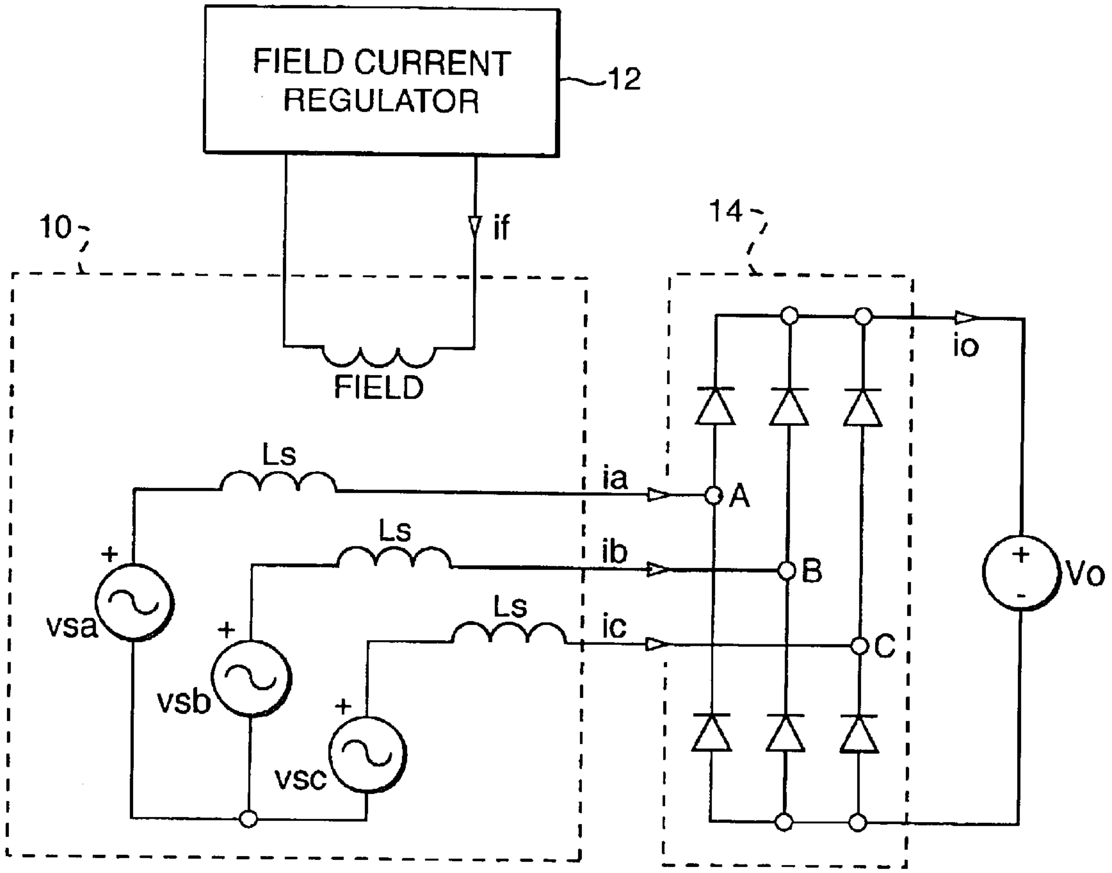
FIG. 1A is a block diagram of a prior art alternator system.

As noted above, those of ordinary skill in the art sometimes refer to the ac machine itself as an alternator while at other times those of ordinary skill in the art refer to the combination of the ac machine coupled to a rectifier circuit also as an alternator. To promote clarity in the text, the term "alternator system" will be used herein to describe a system which includes an ac generator portion and a rectifier portion. The ac generator portion may also be referred to as an "ac machine," an "ac generator," a "generator" or an "alternator" while the rectifier portion of an alternator system will be referred to herein as a "rectifier" or a "rectifier circuit." The term "ac voltage source" is intended to cover any type of source which can be used with the present invention including but not limited to an alternator. The term "control circuit" or "controller" is intended to cover any type of discrete logic, microprocessor, and any combination of microprocessors and discrete logic and analog circuitry capable of implementing the control functions described herein to improve operation of the alternator or alternator system.

In the description herein below, reference is sometimes made to an ac machine having a particular number of phases. Those of ordinary skill in the art will appreciate, of course, that the concepts described herein apply equally well to ac machines having any number of phases including single phase or any poly-phase ac machines. Reference is also sometimes made herein to switched-mode rectifiers (SMR) and SMR controllers having a particular topology. Those of ordinary skill in the art will appreciate that the principles of the present invention can be implemented using a variety of switched-mode rectifier topologies and that those presented herein are only examples and should not be construed as limiting. It should be appreciated that any switched-mode rectifier topology capable of implementing the desired control function can be used.

Reference is also sometimes made herein to alternators or alternator systems operating at a particular voltage level or within a range of voltage levels such as 14 volts (V) or 42V. It should be understood that the principles of the present invention apply equally well to alternators and alternator systems having any voltage levels.

Reference is also sometimes made herein to events related to or synchronized with alternator angular position, rotor angular position, fundamental phase currents, fundamental electrical frequency, and fundamental electrical cycle. It should be appreciated that these references refer to the events being related or synchronized to a point in time when the rotor is in one or more predetermined positions once per revolution for each phase. These events can be sensed by several methods including but not limited to processing the output of a position encoder coupled to a shaft of the rotor of the machine, or a simple reference pulse from a Hall-effect sensor triggered by a magnetic feature on the generator rotor shaft or the polarity of the voltage rectifier diodes, or any other signal which can be used to mark the passing of a particular instant in the cyclic operation of the machine.

Figure 1B:
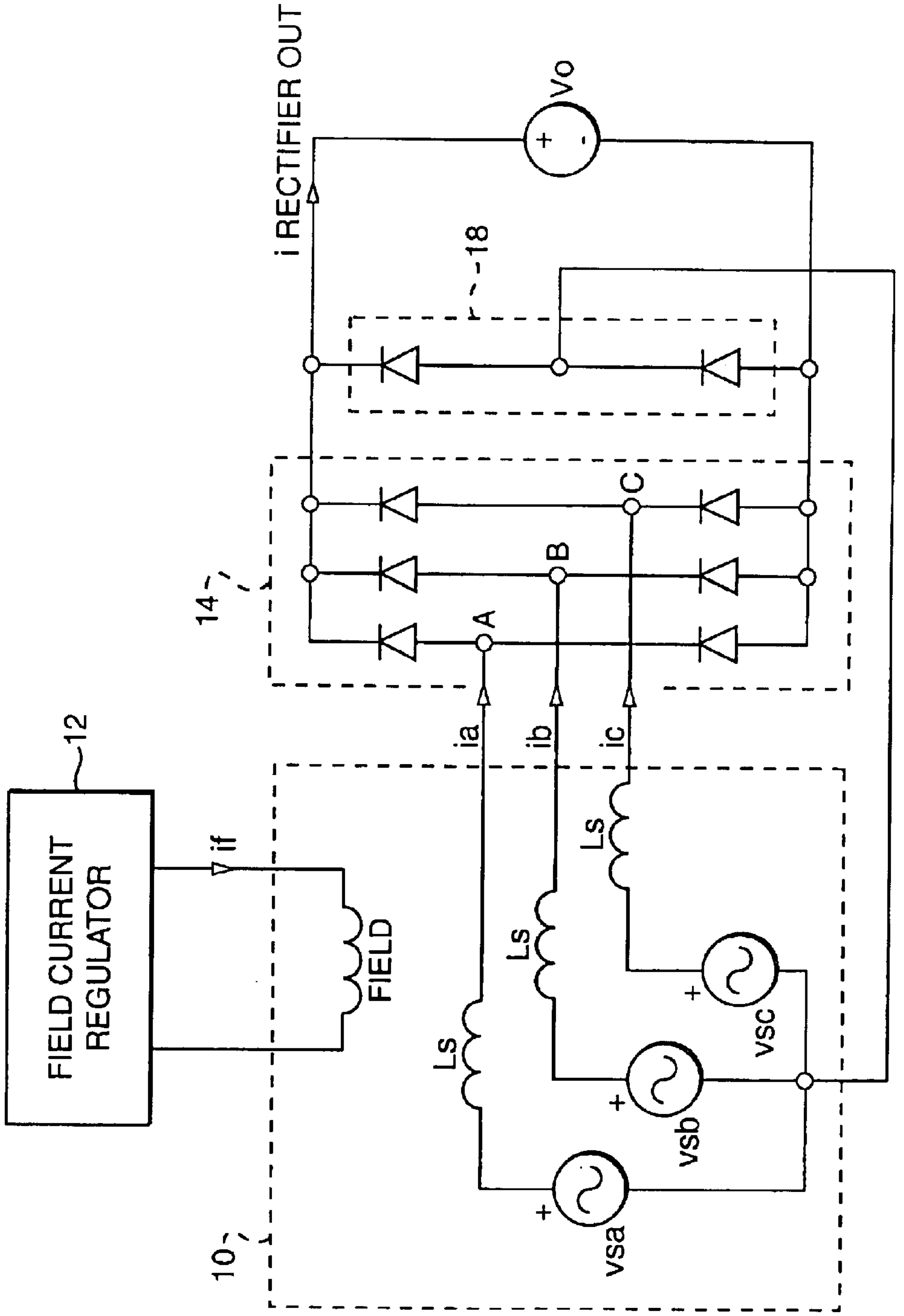
FIG. 1B is a block diagram of a prior art alternator system with booster diodes.
Figure 2:
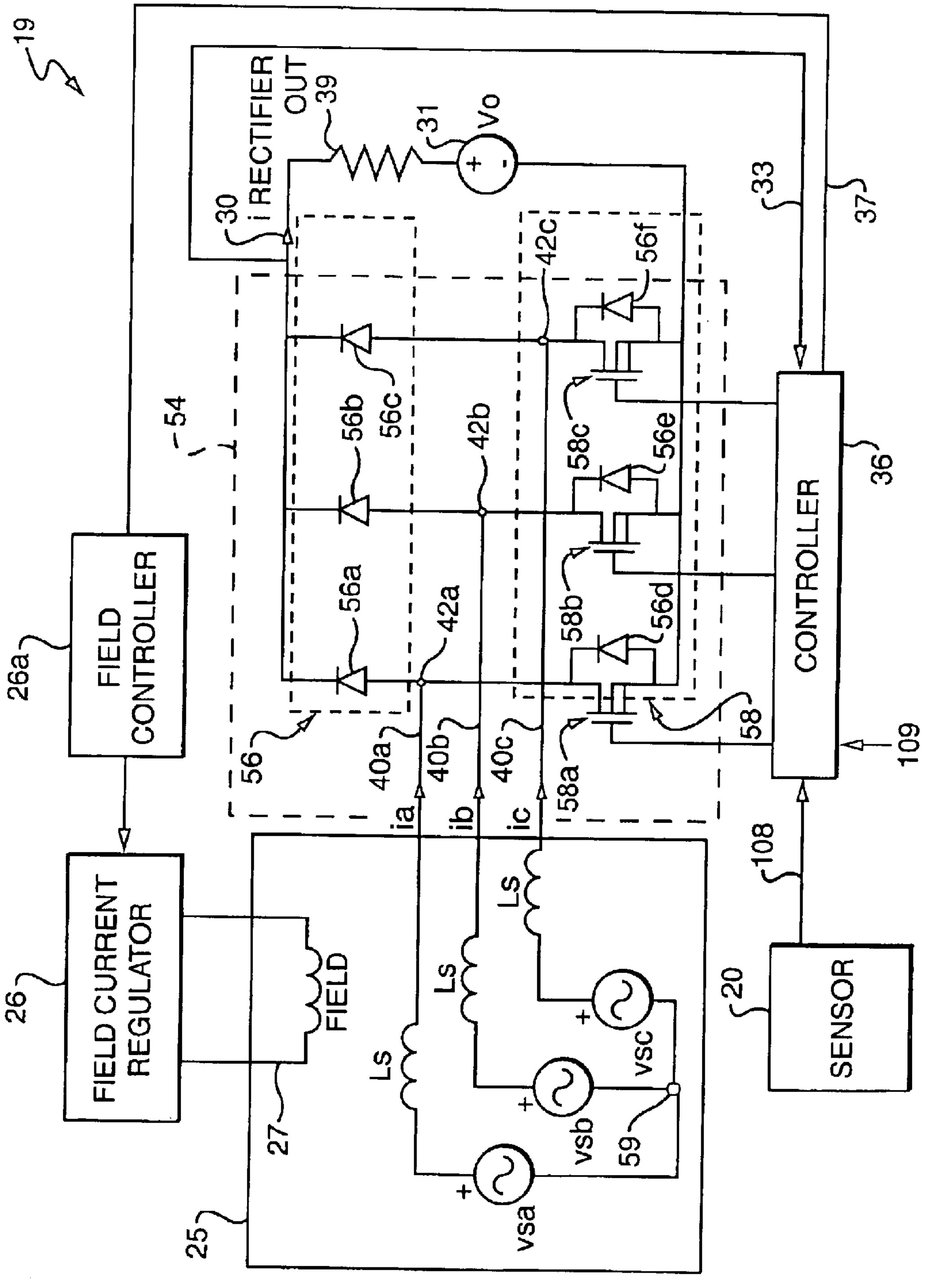
FIG. 2 is a schematic block diagram of an alternator system with switched mode rectifiers and controller according to the present invention.

Referring now to FIG. 2, an alternator system 19 includes an alternator 25 (also referred to as an ac voltage source 25) shown here, for example, as a three phase alternator. The alternator 25 includes a field winding 27 which is coupled to a field current regulator 26 which is in turn coupled to a field controller, 26*a*. It should be appreciated that alternator 25 and field current regulator 26 may be similar to or the same as alternator 10 and field current regulator 12 described above in conjunction with FIG. 1. The alternator 25 is coupled to rectifier circuit 54. The rectifier circuit 54 includes a bridge circuit 56 provided from a plurality of diodes 56*a*–56*f*. A first plurality of diodes 56*a*–56*c* have anodes which are coupled to respective ones of alternator phase winding outputs 40*a*–40*c* at nodes 42*a*–42*c* and a second plurality of diodes 56*d*–56*f* have cathodes coupled to nodes 42*a*–42*c*. Also coupled to the nodes 42*a*–42*c* is a PWM and pulse stage 58 provided from switching elements 58*a*–58*c*. The PWM and pulse stage 58 may be integrated with the bridge circuit 56. Each of the switching elements 58*a*–58*c* has a first terminal coupled to an anode of a respective one of the diodes 56*d*–56*f* and a second terminal coupled to a cathode of a respective one of the diodes 56*d*–56*f*. In one embodiment, the switching elements 58*a*, 58*b* and 58*c* are MOSFETs and the diodes 56*d*, 56*e* and 56*f* are formed by the intrinsic body diodes of the respective MOSFET structures. If MOSFET devices are provided as the switching elements, no discrete diodes are required. The rectifier circuit 54 provides a rectifier current output $i_{rectifierout}$ designated by reference numeral 30 in FIG. 2.

The voltage 31 and resistor 39 represent a Thevenin model for the load. In many cases the load is a battery, in which case voltage 31 and resistor 39 model the internal battery voltage and resistance respectively. The alternator system 19 further includes a controller 36 coupled to the field controller 26*a* via a control line 37. The controller 36 is also coupled to the rectifier circuit 54 and more particularly is coupled to a control terminal of each of the plurality of switching elements 58*a*–58*c*. The controller 36 is also coupled to a sensor 20 which provides one or more sensor signals 108 to the controller 36. The controller 36 is adapted to receive a timing reference event signal 109 which will be described further below. The controller 36 is adapted to receive the output voltage Vo signal of the alternator system 19 via control line 33.

The controller 36 provides a respective controlled pulse sequence to each of the switching elements 58*a*–58*c*. Each of the controlled pulse sequences is comprised of abase duty ratio PWM signal portion and a signal portion related to the angular rotor position, or waveforms of the alternator 25. The base duty ratio PWM signal portion of the control signal is provided as described in commonly assigned, co-pending patent applications, application Ser. Nos. 09/557,844 and 09/558,193. The timing reference pulse signal portion of the controlled pulse sequence is derived from the timing reference event signal 109 which provides a timing reference for each phase of the alternator. The details of providing timing reference event signal 109 to the controller 36 are described below and in conjunction with FIGS. 5, 6 and 8. Briefly, however, timing reference event signal 109 establishes a reference time related to the alternator angular position or waveforms from which controller 36 may provide a controlled pulse sequence to the control terminals of the switching elements 58*a*–58*c*. It will be appreciated by those of ordinary skill in the art, that the controlled pulse sequence can be provided by various methods for example as a logical combination for each phase of a base duty ratio PWM signal and a pulse sequence (as described in conjunction with FIG. 5). In another example, the controlled pulse sequence can be provided as a PWM signal for each phase having a duty ratio provided by a bounded summation of a common (i.e. one signal for all phases) base duty ratio signal and a timing duty ratio signal for each phase (as described in conjunction with FIG. 8). The PWM signal of FIG. 8 effectively includes the base duty ratio PWM signal and the timing reference pulse.

The controlled pulse sequence signals provided to the respective control terminals of switching elements 58*a*–58*c* can be represented as the combination of two inputs. The first input (for each phase) is a relatively high frequency base duty ratio pulse-width modulated (PWM) waveform of specified duty ratio (which may be a function of alternator output voltage, speed, field current, and other operating parameters), and which may optionally be identical for all the switching elements 58*a*–58*c*. The base duty ratio is selected by the controller 36 to provide a particular selected voltage or load matching function. The base duty ratio of this PWM signal controls the effective voltage seen by the alternator machine 25 to any value below the true alternator system output voltage. The second input (for each phase) is a timing reference pulse waveform having a period which corresponds to a fundamental electrical period of the machine. The timing reference pulse waveform is synchronized with the electrical waveforms (e.g., timed with respect to the back emf voltage, a current waveform for that machine phase, or with respect to rotor angular position of the alternator 25). It has been recognized in accordance with the present invention that by synchronizing the timing reference pulse waveform to the electrical waveform to change the conduction times of the switching elements 58*a*–58*c* and rectifiers (thereby changing the voltage applied to the machine), output power levels are achieved at idle or near idle engine speeds and above which are greater that output power levels achieved using conventional approaches.

In one particular embodiment, switching elements 58*a*, and 58*b*, and 58*c* are gated on and off individually via a controlled pulse sequence provided by controller 36. The switching elements 58*a*, 58*b*, 58*c*, can be provided, for example, as metal oxide semiconductor field effect transistor (MOSFET) switches which are three terminal devices that also internally include diodes 56*d*–56*f* as described above. Controller 36 increases the output power of the alternator 25 at speeds above idle by controlling switching elements 58*a*–58*c* in the legs of the bridge. The switching elements 58*a*–58*c* are gated on and off together with a duty ratio that is a function of one or more of alternator speed, field current, and output voltage. The base duty ratio provides an additional control handle which allows improved impedance and power transfer matching between the alternator 25 and the load (and hence increased output power). At speeds near idle, controller 36 increases power output as described above.

In the embodiment of FIG. 2, the control of the switching elements 58*a*–58*c* and the field current is determined for various speed and load conditions. The control signals provided to the switching elements 58*a*–58*c* are derived individually from a combination of a PWM waveform with an adjustable base duty ratio and a timing reference pulsed waveform triggered indirectly by the machine electrical cycle and having the same period as the machine electrical cycle. The field current is controlled by control signals sent to the field controller 26*a* to control the field current regulator. In one embodiment, the speed range is divided into discrete intervals and the control of the switching elements 58*a*–58*c* and the field controller 26*a* is adjusted whenever the speed interval changes. Control of the switching elements 58*a*–58*c* and the field controller 26*a* is further adjusted as a function of the load on the alternator system 19. The control of the frequency and base duty cycle of the PWM component is described in co-pending applications, application Ser. Nos. 09/557,844 and 09/558,193. In one embodiment, the control of the three components is interrelated, so for example at a reduced load and lower speed, the base PWM duty cycle is lowered, the field current is lowered and the machine frequency timing reference pulsed waveform is adjusted. These control adjustments are made simultaneously.

The sensor 20 coupled to the controller 36 provides one or more sensor signals 108 to the controller 36. The sensor signals 108 include but are not limited to an alternator rotational speed input (or a signal from which the alternator rotational speed can be derived), voltage and current measurements, and thermal measurements. Controller 36 receives a timing reference event signal 109. The timing reference event signal 109 can be any repetitive signal related to the alternator position or waveforms. For example, timing reference event signal 109 can be provided as a given count from a position encoder coupled to a shaft of the rotor of the machine 25, or can be provided as a simple reference pulse from a Hall-effect sensor triggered by a magnetic feature on the generator rotor shaft or the polarity of the voltage across a subset of the diodes 56*a*–56*f*, or as any other signal which can be used to mark the passing of a particular instant in the cyclic operation of the machine. It should be appreciated that there are other means to generate the timing reference event signal 109.

The controller 36 additionally regulates the output power by controlling the field current via field controller 26*a*. Control of field current by the field current regulator 26 and field controller 26*a* depends upon the alternator operating condition and the current drawn by the voltage source load. In automotive applications, for example, the presence of a large load is indicated by a relatively low voltage on the generator terminals because the battery voltage drops as the battery supplies current to a load.

When the alternator system 19 is operating at idle or lower speeds, and the load draws a large current, the field current is driven to its maximum value. At a relatively high alternator system speed, the alternator system 19 provides an output power level which is greater than the output power levels provided at idle speeds even without any switching of the switch elements in the PWM and pulse stage 58. In this relatively high alternator system speed operating condition, the alternator 25 can be controlled via conventional field current regulation and the gate control output of the controller 36 holds the switching elements 58*a*, 58*b* and 58*c* off (i.e. in a non-conduction state). As speed and load vary from high speed-large load conditions, the control of the switching elements 58*a*, 58*b* and 58*c* can pass through a succession of intermediate operating conditions, each of which includes some degree of base duty ratio PWM action and some degree of timing-reference-pulse-based d waveform action for the switch elements in PWM and pulse stage 58, and each of which regulates the field winding current. In each of these intermediate conditions, the alternator 25 provides more power than would be possible with conventional alternator systems.

Since the pulse-control parameters and the base PWM duty ratio for maximum power output are both capable of being defined empirically, it is possible for the timing reference pulse control and PWM base duty ratio and field current parameters for these intermediate conditions to also be determined empirically. A set of rules are determined to specify how these parameters are varied in combination in response to intermediate load conditions, and these rules are implemented in the controller 36.

In one embodiment, a combination of timing reference pulse parameters, PWM base duty ratio and field current control by the field current regulator 26*a* or a state regulator (included as part of controller 36 in FIG. 2), which meet the load requirements while maximizing the efficiency of the alternator system 19 are determined for a number of intermediate load points. The controller 36 then interpolates among these empirically determined optimized combinations to achieve favorable operation at the intermediate load points.

Although not shown explicitly in FIG. 2, the alternator system 19 can optionally include a fault protection circuit and a state regulator as described in co-pending applications, application Ser. Nos. 09/557,844 and 09/558,193.

Referring now to FIGS. 3A–3D, computer simulated waveforms of the current and voltage signals in the alternator system 19 (FIG. 2) are shown when alternator system 19 is controlled by the inventive techniques described herein.

Figure 3A:
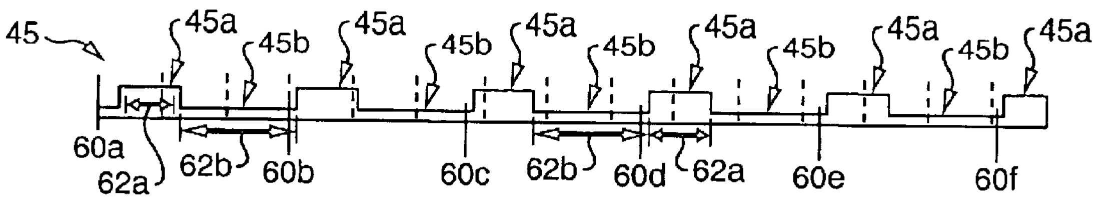
FIG. 3A is a plot of a controlled pulse sequence waveform vs. time for switching element 58*a* in FIG. 2.

Referring first to FIG. 3A, a controlled pulse sequence waveform 45 corresponds to an exemplary switching waveform for the phase "a" switching element 58*a* (FIG. 2) without a base duty ratio PWM component (or equivalently where the base duty ratio approaches zero) is shown. Each of a plurality of timing marks 60*a*–60*n* indicates the start of a fundamental electrical cycle of the alternator 25 (FIG. 2). A single fundamental cycle is for example the time period between 60*a* and 60*b*. When the switching element 58*a* is closed (i.e. the switch is in a conduction state) a low impedance signal path exists in a path parallel to the diode 56*d* (FIG.2) and when the switching element 58*a* is open (i.e. the switch is in a non-conduction state), in the path parallel to the diode 56*d* provided by the switching element 58*a* corresponds to a high impedance signal path. Thus, regions 45*a* (i.e. the waveform is high) correspond to the time periods when switching element 58*a* is closed while regions 45*b* (i.e. the waveform is low) corresponds to periods when switching element 58*b* is open. In this example, the b and c phase waveforms would be similar but phased 120 degrees and 240 degrees respectively later.

During each fundamental electrical cycle, the waveform is high (switching element 58*a* is closed) for an interval 62*a* and the waveform is low (switching element 58*a* is open) for an interval 62*b*. The duration of intervals 62*a* and 62*b*, and the position of regions 45*a* and 45*b* within a fundamental electrical cycle are adjustable (as described in more detail in conjunction with FIGS. 6A and 6B). The duration of intervals 62*a* and 62*b*, and the position of regions 45*a* and 45*b* within a fundamental electrical cycle are set such that the alternator can provide more power at selected low speeds (e.g. idle speed and near idle speed). The controller 36 (FIG. 2) can adjust the duration of 62*a* and 62*b*, and the position of regions 45*a* and 45*b* within a fundamental electrical cycle, on a periodic basis or the adjustments can be made as a function of operating speed. The adjustments can also be made as a function of load on the alternator system 19 (FIG. 2).

The controller 36 provides the controlled pulse sequence waveform 45 to the control terminal of control switching element 58*a* and similar waveforms to control switching elements 58*b* and 58*c*. The control of switching elements 58*a*–58*c* modify the currents flowing in the windings, including changes in harmonic content, resulting in increased output power. Increased power is achieved through increased magnitude and/or improved phase of the fundamental component of the phase currents.

Figure 3B:
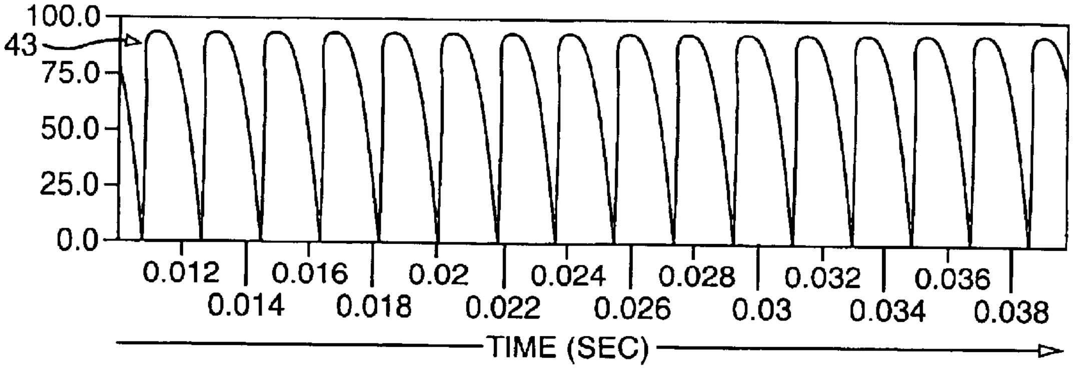
FIG. 3B is a plot of rectifier output current ($i_{rectifier\ out}$) VS. time.

Referring now to FIG. 3B, a rectifier output current waveform 43 (corresponding to $I_{rectifierout}$ 30 in FIG. 2) is shown as a function of time when the switching element 58*a* is controlled by the controlled pulse sequence waveform 45 (and switching elements 58*b* and 58*c* are similarly controlled) as described above in conjunction with FIG. 3A. The current waveform is dominated by so-called three-pulse ripple patterns. There are three major switching events for each period of the generator internal voltage. The timing of the three pulses is related to the transition of switching elements 58*a*, 58*b* and 58*c* from the closed state to the open state. While one of the switches (e.g. 58*a*) is closed, the current increases in the corresponding phase, but all of the current flows in the switch not through the load. When the switch opens, (at the time of the transition from region 45*a* to region 45*b* in FIG. 3A), the current phase "a" must then flow through the load. The result is a very rapid increase in load current at that same time. One pulse per electrical cycle is the result of the action of switching element 58*a*; switching elements 58*b* and 58*c* also contribute one pulse per cycle each.

Figure 3C:
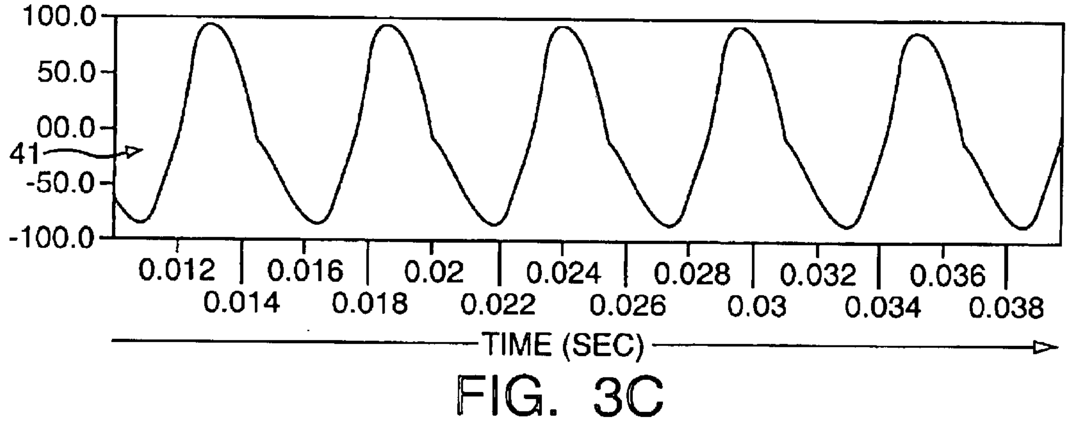
FIG. 3C is a plot of phase "a" current vs. time taken at point 40*a* in FIG.2.

Referring now to FIG. 3C, a current waveform 41 for phase "a" (corresponding to $i_a$ 40*a* at node 42*a* in FIG. 2) is shown. Phase "a" current 41 is a superposition of three contributions, (1) the phase "a" contribution to the load current; (2) an internal commutating current which circulates between phases during intervals when more than two diodes are conducting; and (3) an internal circulation current when switching element 58*a* is closed. Waveform 41 shows that each phase is essentially in continuous ac-side conduction. Although waveform 41 shows continuous ac-side conduction, the dc-side waveform 43 (FIG. 3B) is almost in discontinuous conduction. FIG. 3C therefore is very close to a transition from continuous ac-side conduction to discontinuous ac-side conduction. During the interval when switching element 58*a* is conducting, current builds rapidly in phase "a." When switching element 58*a* switches off, at the end of region 45*a*, an abrupt change in the slope of the current waveform occurs, as the load voltage is suddenly introduced in opposition to current flow. A second change in slope occurs at the point where the phase current reaches zero. If the circuit were in discontinuous ac-side conduction, the current following the time when the phase current reaches zero would remain zero. Because the case shown is a transition from discontinuous ac-side conduction to continuous ac-side conduction, phase "b" switching element 58*b* transitions to open, just as phase "a" current reaches zero, producing waveform 41. If the load current were greater than in the case shown here, the transition of switch 58*b* and the current to zero in phase "a" would not have been so nearly simultaneous, and the discontinuity of current slope would have occurred at another time.

Figure 3D:
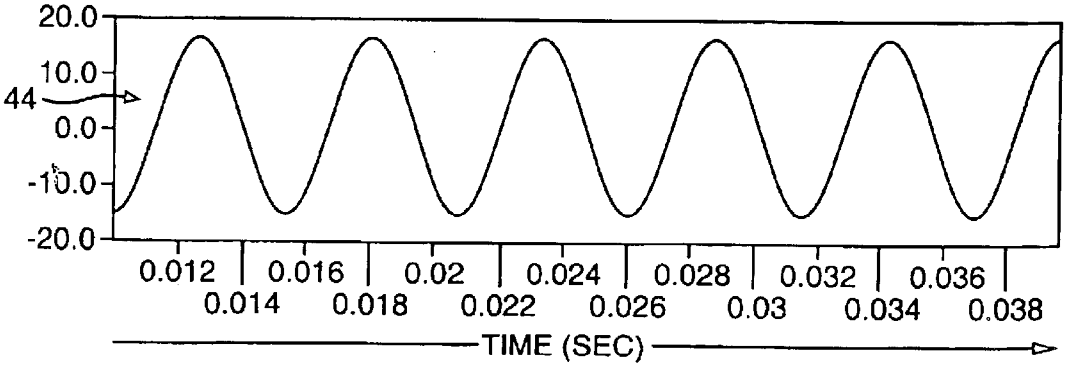
FIG. 3D is a plot of voltage vs. time taken between Vsa and Vsb in FIG. 2.

Referring now to FIG. 3D, a sinusoidal voltage waveform 44 corresponding to the phase "a" to phase "b" source voltage (i.e. Vsa-Vsb in FIG. 2) illustrates the voltage amplitude and phase in comparison to signal waveforms 41, 43 and controlled pulse sequence waveform 45.

Figure 4:
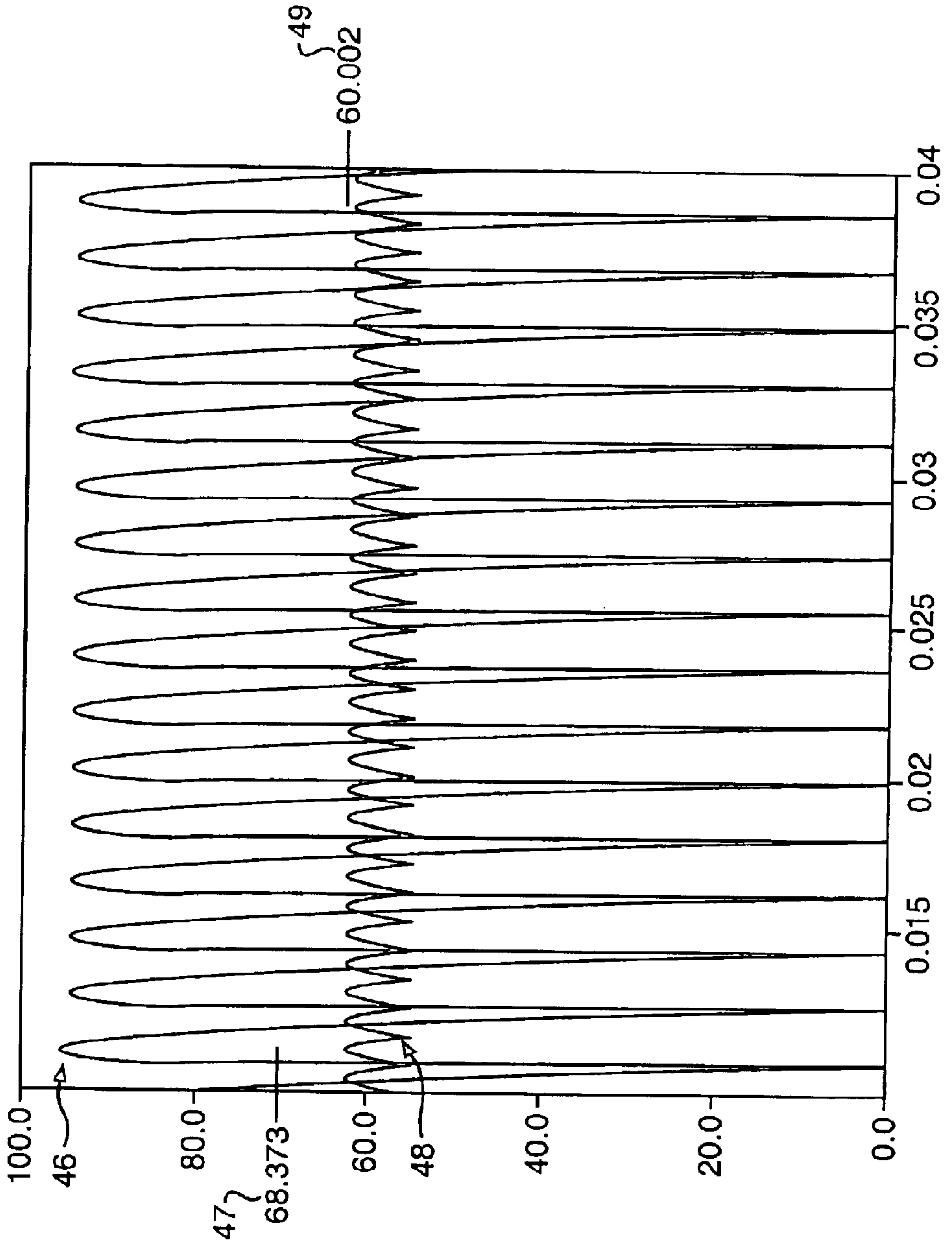
FIG. 4 shows several waveforms at various points in an alternator system of the type described in conjunction with FIG. 2.

Referring now to FIG. 4, a first current waveform 46 is provided by the operation of the alternator system 19 (FIG. 2) by operating the switching elements, 58*a*–58*c* via control signals provided by the controller 36 (FIG. 2). The waveform 46 is identical to waveform 43 of FIG. 3B, and represents operations with the same controlled pulse sequence waveform 45 of FIG. 3A. A second current waveform 48 is provided from the circuit of FIG. 2 without operating the switches, 58*a*–58*c*. The switching techniques used to provide waveform 46 produces an output current average 47 of 68.373 amperes (amps) while the output current average 49 without switching is 60.002 amps. Based upon these values, the increase in average output current using the switching technique of the present invention is approximately fourteen percent.

Figure 5:
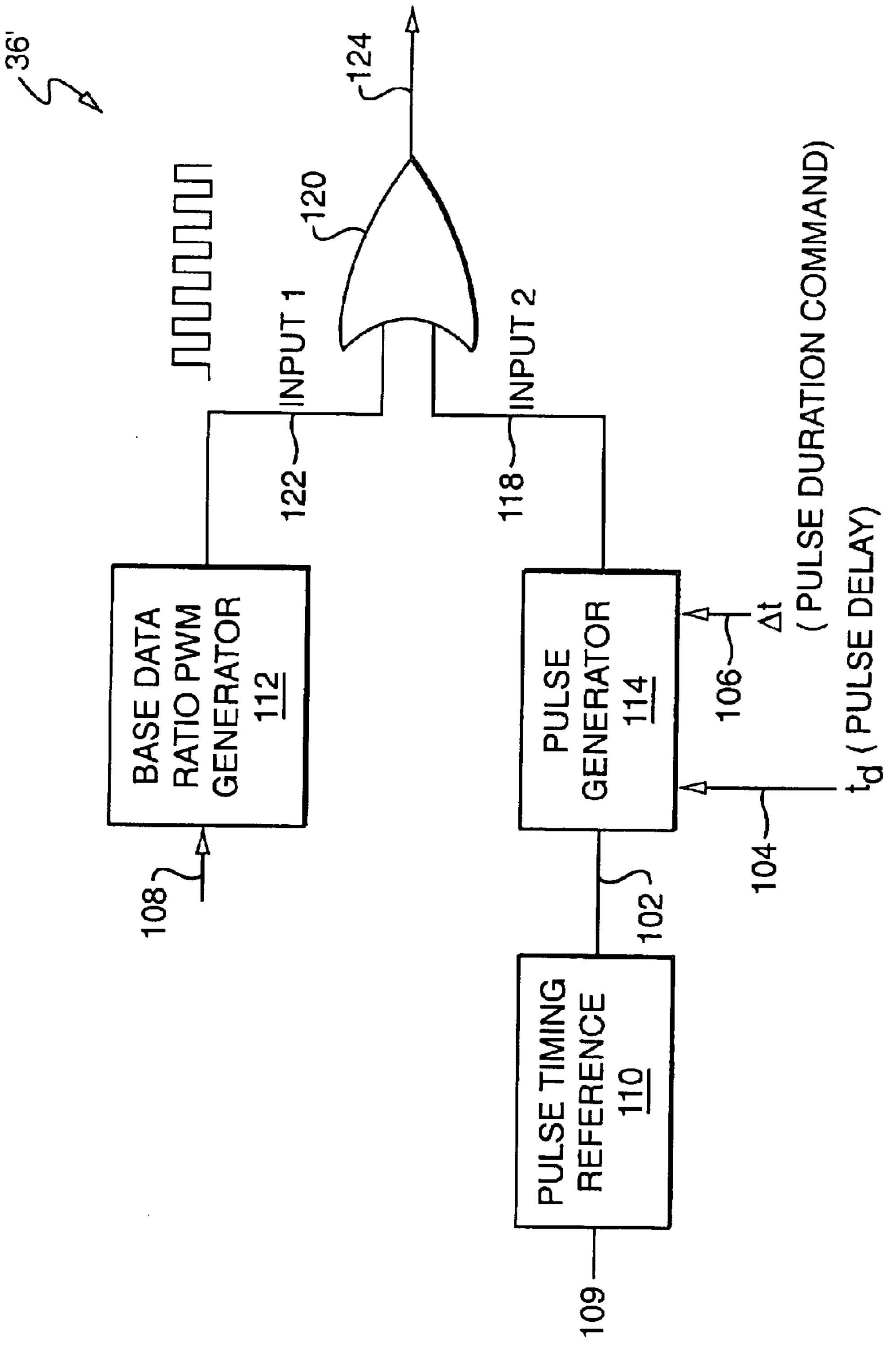
FIG. 5 is a block diagram of a controller according to the present invention.

Turning now to FIG. 5, a controller 36' which may be similar to portions of controller 36 described above in conjunction with FIG. 2 includes a pulse timing reference circuit 110 adapted to receive a timing reference event signal 109 at an input thereof. The pulse timing reference circuit 110 provides a pulse timing reference signal 102 to a first input of a pulse generator 114. The pulse generator 114 is adapted to receive a pulse delay signal $t_d$ 104 at a second input thereof and a pulse duration command signal ΔT 106 at a third input thereof. An output of the pulse generator 114 is coupled to an input port 118 of a logic circuit 120 which implements a logical OR function.

The purpose of the pulse timing reference signal 102 and will be described below. One approach for providing such a reference signal 102 is to measure either the phase current or the active switch/diode pair current polarity or voltage (from which the phase current polarity can be derived), and provide timing reference event signal 109. In response to the timing reference event signal 109, here for example the phase current, crossing from negative to positive (shown at time 126 in FIG. 6A), the pulse timing reference circuit 110 provides the pulse timing reference signal 102.

The controller 36' further includes a base duty ratio PWM generator 112. The base duty ratio PWM generator 112 is adapted to receive a sensor signal 108 and derives a base duty ratio PWM duty ratio signal from the sensor signal 108. The base duty ratio PWM generator 112 uses the base duty ratio signal to adjust the base duty ratio of a PWM pulse train which it provides to the input port 122 of logic circuit 120. The output 124 of logic circuit 120 is coupled to a control terminal of a switch (e.g. gate terminal of switching element 58*a* using phase "a" in FIG. 2 as an example). In practice, output signals from similar circuits with different pulse timing reference signals 102 will be provided to multiple control terminals (e.g. each of the gates of switching elements 58*b* (FIG. 2) and 58*c* (FIG. 2).

In operation, in response to the timing reference event signal 109, the pulse timing reference circuit 110 generates pulse timing reference signal 102 and provides the pulse timing reference signal 102 to the pulse generator 114. The pulse generator 114 receives the pulse timing reference signal 102 as well as the pulse delay signal $t_d$ 104 and the pulse duration command signal ΔT 106 and in response thereto, the pulse generator provides a signal to the logic circuit 120.

It should be appreciated that the controller 36' is shown for a single phase in FIG. 5 and that the controller 36' can be replicated and used to control multiple phases. In the case where multiple controllers are used, a phase-shifted pulse timing reference signal 102 would be generated for each of the multiple phases. To achieve symmetrical operation among the phases, phase "b" should be 120 electrical degrees later than phase "a"; phase "c" should be 240 degrees later than phase "a."

In one embodiment, the controller 36 (FIG. 2) includes three controllers 36' (for a three phase machine) plus additional circuitry (not shown) which can for example provide a command signal to the field controller 26*a*. The controller 36 regulates the output power by coordinating control of the field current with the control provided by controllers 36'.

Additionally, by controlling the base duty ratio of the signals coupled to input port 122 and the pulse duration and timing coupled to input port 118, controller 36' enables an alternator system to provide, over a range of alternator operating speeds, power levels which are greater than power levels provided by conventional alternator systems over a like range of alternator speeds.

In the case where the signal at input port 118 is a single pulse of specified duration, the pulse then starts a predetermined time $t_d$ after the phase current changes, for example, from negative to positive as described below in conjunction with FIG. 6A. Operation of the controller 36' with a pulse provided to input port 118 having a pulse duration of zero is equivalent to operation of the controller 36' with only the PWM generator 112. This approach (i.e. operation with only the base duty ratio PWM generator), however, does not provide additional power at idle speed since conventional alternators are already designed to achieve optimum matching for full field at idle speed. As a result, the load matching achieved via only base duty ratio PWM control of the switching elements 58*a*–58*c* provides substantially increased output power capability for speeds above idle, but does not improve the performance at idle.

By utilizing both pulse control provided by pulse timing reference circuit 110 and pulse generator circuit 114 and base duty ratio PWM control provided by base duty ratio PWM generator 112, the present invention provides an alternator system having improved power output for all operating points including operating points at or near idle speed. The present system, therefore, provides alternator system performance improvements at alternator speeds above idle speed, and also at and near idle speed.

The duration and delay of the pulse provided to input port 122 and the base duty ratio of the PWM signal at input port 122 are selected to achieve improvement in output power (as compared to conventional alternator systems) while limiting the ripple, machine currents, and heating of the stator windings to an acceptable level. In one embodiment, the characteristics of the pulses provided to input port 118 and the base duty ratio duty ratio of the signals provided to port 122 are selected empirically by measuring alternator system output power at various combinations of alternator system parameters including but not limited to alternator speed, alternator field current, pulse width, pulse duration and PWM base duty ratio. The timing of the pulse waveform provided to input port 118 for each phase can be based on rotor angular position, which can either be measured or estimated using a variety of known methods. It will be appreciated by those of ordinary skill in the art, that there are several methods to sense the change in polarity of signals related to the alternator position or waveforms or equivalently to sense a point delayed in time after the change in polarity.

Figure 6A:
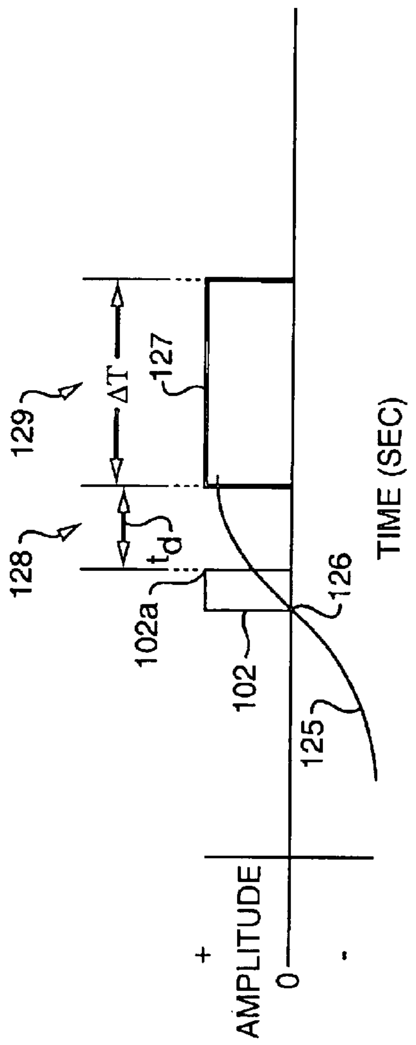
FIG. 6A and 6B are a series of timing diagrams of pulses generated in conjunction with the circuit of FIG. 5.
Figure 6B:
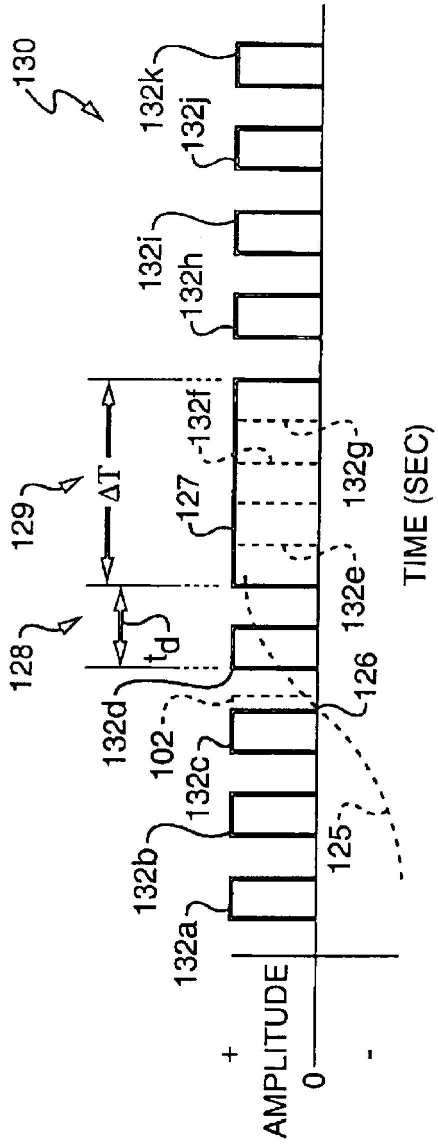

Referring now to FIGS. 6A–6B, the operation of the controller 36' (FIG. 5) is illustrated by an example. Specifically, FIG. 6A shows pulse timing reference signal 102, a timing reference event signal 125 (similar to the timing reference event signal 109 of FIG. 5), an illustrative pulse delay interval $t_d$ 128, an illustrative pulse duration interval ΔT 129 and an illustrative timing reference pulse 127 (e.g. from pulse generator 114 in FIG. 5). It should be appreciated in FIG. 6A, that pulse timing reference signal 102 first occurs in time followed by interval $t_d$ 128 and then by timing reference pulse 127 (i.e. pulse timing reference signal 102 occurs before interval 128 which in turn occurs before timing reference pulse 127). Likewise in the example shown in FIG. 6B, pulse 132*a* occurs first in time while pulse 132*k* occurs last in time. As shown in FIG. 6A, in one embodiment the timing of the pulse timing reference signal 102 is provided by the timing reference event signal 125 changing from negative to positive (i.e. the zero crossing point). The timing reference event signal 125, here derived from a phase current, provides the reference signal corresponding to the timing reference event signal 109 (FIG. 5) having a frequency characteristic corresponding to a fundamental frequency of the alternator. When the timing reference event signal 125 crosses from a negative current to a positive current (referred to as zero crossing 126), the pulse timing reference circuit 110 (FIG. 5) generates the pulse timing reference signal 102. The pulse timing reference signal 102 is provided as an input to the pulse generator 114 (FIG. 5), which responds to the trailing edge 102*a* of the pulse timing reference signal 102. One convenient way to sense the zero crossing of the timing reference event signal 125 is to monitor the sign of the voltage at node 42 (FIG. 2) with respect to the negative terminal of voltage 31 (FIG. 2) by providing this voltage as the timing reference event signal 109 input to the pulse timing reference circuit 110.

The pulse delay interval $t_d$ 128 begins a predetermined time after the zero crossing 126. In this particular example, the pulse delay interval $t_d$ 128 begins at the end of (i.e. at the trailing edge of) the pulse timing reference signal 102. Similarly, the pulse duration interval ΔT 129 begins a predetermined period of time after the zero crossing 126. In this particular embodiment, the pulse duration interval ΔT 129 begins after the expiration of the pulse delay interval $t_d$ 128. Thus, in this example, the pulse duration interval ΔT 129 follows the pulse delay interval $t_d$ 128 which is initiated by the pulse timing reference signal 102 in order to provide an adjustable width pulse variably delayed from the start of a fundamental electrical cycle having a fundamental electrical frequency ω. The pulse delay interval $t_d$ 128 and pulse duration interval ΔT 129 can be provided as fixed intervals, intervals supplied by a lookup table based on alternator operating parameters including but not limited to speed, alternator system current and terminal voltage. The fundamental parameters of the timing reference pulse 127 are its pulse duration interval ΔT 129 and its timing with respect to the alternator position or waveforms which can be derived for example from internal machine voltages Vsa, Vsb, Vsc respectively for each phase. For any combination of alternator speed, field current, load current and pulse duration interval ΔT 129, there is one time interval to start the timing reference pulse 127 which maximizes the increase in alternator output power. Other start time intervals result in a smaller alternator power increase or possibly an alternator power decrease.

The pulse duration interval ΔT 129 has a direct impact on the output power. For relatively effective timed pulses, the output power at first increases with pulse duration, eventually reaching a maximum and then decreases (for fixed speed, field current and load current). However, as pulse duration increases, so does the root mean squared (rms) values of phase current, and also dc-side ripple current, and in the case of a dc load with a non-zero incremental impedance, ripple voltage increases. It has been determined that one or more of these values reaches objectionable levels before the pulse duration interval ΔT 129 for maximum power is reached. For a predetermined operating condition, the pulse duration interval ΔT 129 is selected as a compromise between more output power and limitations on stator heating (proportional to the square of the rms phase current) and ripple.

FIG. 6B shows an output waveform 130 provided for example from logic controller 36' (FIG. 5). Waveform 130 is a logical OR combination of pulse generator timing reference pulse 127 and illustrative base duty ratio PWM pulses 132*a*–132*k* provided by base duty ratio PWM generator 112 (FIG. 5). When the pulse generator timing reference pulse 127 is not present, a plurality of base duty ratio PWM signals 132*a*–132*d* and 132*h*–132*k* are present. During the period of the timing reference pulse 127, base duty ratio PWM signal 132*e*–132*g* are present but the output of the logic controller 36' reflects the level of the timing reference pulse 127 during the pulse duration interval ΔT 129. As will be described further in connection with FIG. 8A, the base duty ratio PWM output signals 132*a*–132*k* can be continuously present, or the base duty ratio PWM generator 112 can cease all modulation for some time. The base duty ratio PWM modulation can be stopped or adjusted in base duty ratio by additional controllers (not shown) included in base duty ratio PWM generator 112 or with additional logic elements. Additionally the controller 36 (FIG.2) can change the relatively high frequency base duty ratio PWM modulation signals 132*a*–132*k* during a machine fundamental electrical cycle by varying the base duty ratio and can combine the base duty ratio PWM modulation, the pulse generation timing reference pulse 127, with control of the field current to achieve improved power output over a wider range of engine speeds.

Simulation of such operation for one particular alternator at idle speed with full field operation (1800 rpm, duty ratio (d)=0.67) results in an output power of about 843 W. In one embodiment, the base duty ratio PWM generator 112 provides base duty ratio PWM modulation having a duty ratio d=0.66 and pulse generator 114 provides the pulse duration interval ΔT 129 of 200 μs and the pulse delay interval $t_d$ 128 of zero seconds relative to the positive zero crossing, of voltage signal (Vsa-Vsb), a fifteen percent improvement in output power to a level of 970 W is achieved. An increase of pulse duration interval ΔT 129 to 400 μs results in an increase of twenty-five percent to 1052 W of output power at the expense of higher output current ripple and larger root mean square (rms) machine currents. Use of d=0 and pulse duration 1.4 ms (the pulse delay interval $t_d$ 128 still at zero) further increases the output power to 1.4 kW (+67%) at the expense of larger ripple currents and higher machine and device currents. Thus, the present invention allows substantial increases in alternator system output power as compared to conventional systems. The controller 36 (FIG. 2) selects the duty ratio and pulse duration to achieve a compromise between increased output power and increased ripple and heating.

Figure 7:
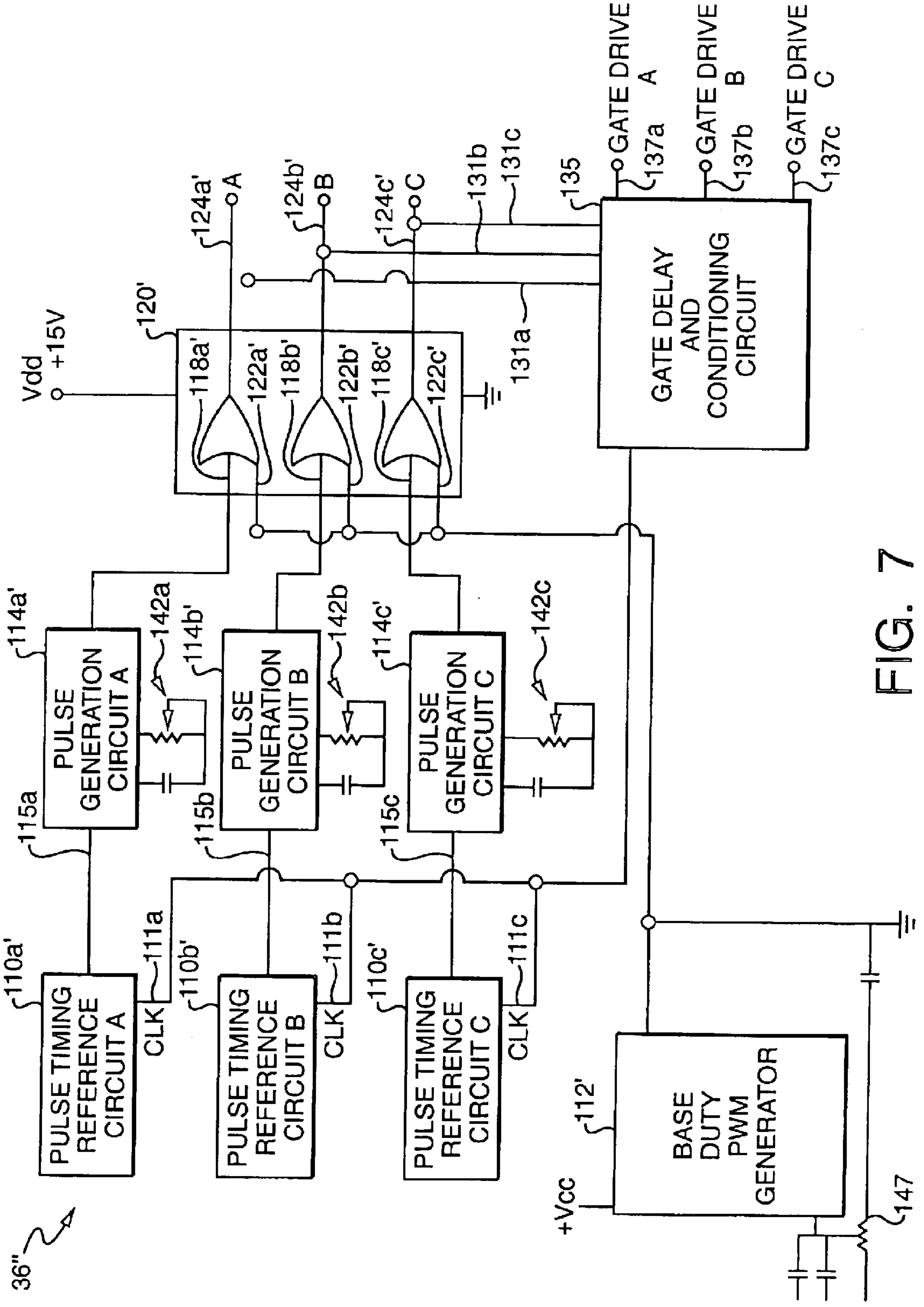
FIG. 7 is a schematic diagram of an embodiment of the controller according to the present invention.

Referring now to FIG. 7, controller 36" includes a logic circuit 120'. In this particular example, logic circuit 120' is adapted to control a three phase alternator (not shown). Thus, the logic circuit 120' is provided having a plurality of input ports 118*a*'–118*c*' and 122*a*'–122*c*' and a plurality output ports 124*a*'–124*c*'.

For each alternator phase, the logic circuit 120' is adapted to receive signals at respective ones of first input ports 122*a*'–122*c*' from a common base duty ratio PWM generator 112', and signals at respective ones of second input port 118*a*'–118*c*' from respective ones of pulse generation circuits 114*a*'–114*c*'. In response to the signals fed thereto, logic circuit 120' provides output signals at respective ones of output ports 124*a*'–124*c*'. It should be noted that although the inputs of the logical OR gates for the different phases are derived from identical circuits for different phases, they are not the same signal.

The PWM generator 112' is coupled to each of the input ports 122*a*'–122*c*' and a respective one of the pulse generator circuits 114*a*'–114*c*' are coupled to respective ones of the input ports 118*a*'–118*c*'.

The controller 36" further includes a plurality of pulse timing reference circuits 110*a*'–110*c*'. In one embodiment, the pulse timing reference circuits are provided as latch circuits which receive a clock signal at respective ones of ports 111*a*–111*c* from a gate delay and conditioning circuit 135. In response to the respective clock signals, each of the pulse timing reference circuits 110*a*'–110*c*' provide a pulse signal to respective ones of trigger inputs 115*a*–115*c* of the respective pulse generation circuits 114*a*'–114*c*'.

The outputs 124*a*'–124*c*' of the logic circuit 120' are coupled to a plurality of gate delay and conditioning circuits which for simplicity are here shown as gate delay and conditioning circuit 135. The gate delay and conditioning circuit 135 receives signals from logic circuit 120' at ports 131*a*–131*c*. Output ports 137*a*–137*c* of circuit 135 are the coupled to control terminals of the respective switching elements 58*a*, 58*b* . . . 58*n* (FIG. 2) for each phase.

In one embodiment, potentiometer 142 coupled to PWM generator 112' sets a duty ratio, and potentiometers 142*a*–142*c* coupled to pulse generator 114*a*'–114*c*' respectively set a pulse duration. It should be appreciated that the duty ratio and pulse duration could also be set by other types of analog circuits, or by a digital logic circuit or by a microprocessor. The duty ratio and pulse duration values could, for example, be calculated in real time, generated by a lookup table, or provided by other means as is known in the art.

The controller 36" also regulates the duty ratio coupled to input port 120', and pulse duration and timing coupled to input port 122', and achieves greater power than possible with conventional alternator systems operating at like alternator speeds. The pulse generator 114' may be provided, for example, as a monostable multivibrator and is shown here without an initial delay function and having the pulse duration set by the potentiometer 142 set at a fixed speed (e.g. idle speed).

The gate delay and conditioning circuit 135 controls the sampling time of the pulse timing reference circuits 110', here a latch circuit, such that the current sign for the sensed phase can be determined from the phase voltage (e.g. node 42 in FIG. 2) during the off time of the respective ones of the switch (e.g. respective ones of switching elements 58*a*, 58*b*, 58*c* in FIG. 2).

It should be appreciated that the controller 36" may be implemented in a variety of manners including but not limited to a custom integrated circuit. The particular techniques used to fabricate a practical controller will depend on a variety of factors including but not limited to the manufacturing cost, size and reliability of the resultant part.

Figure 8:
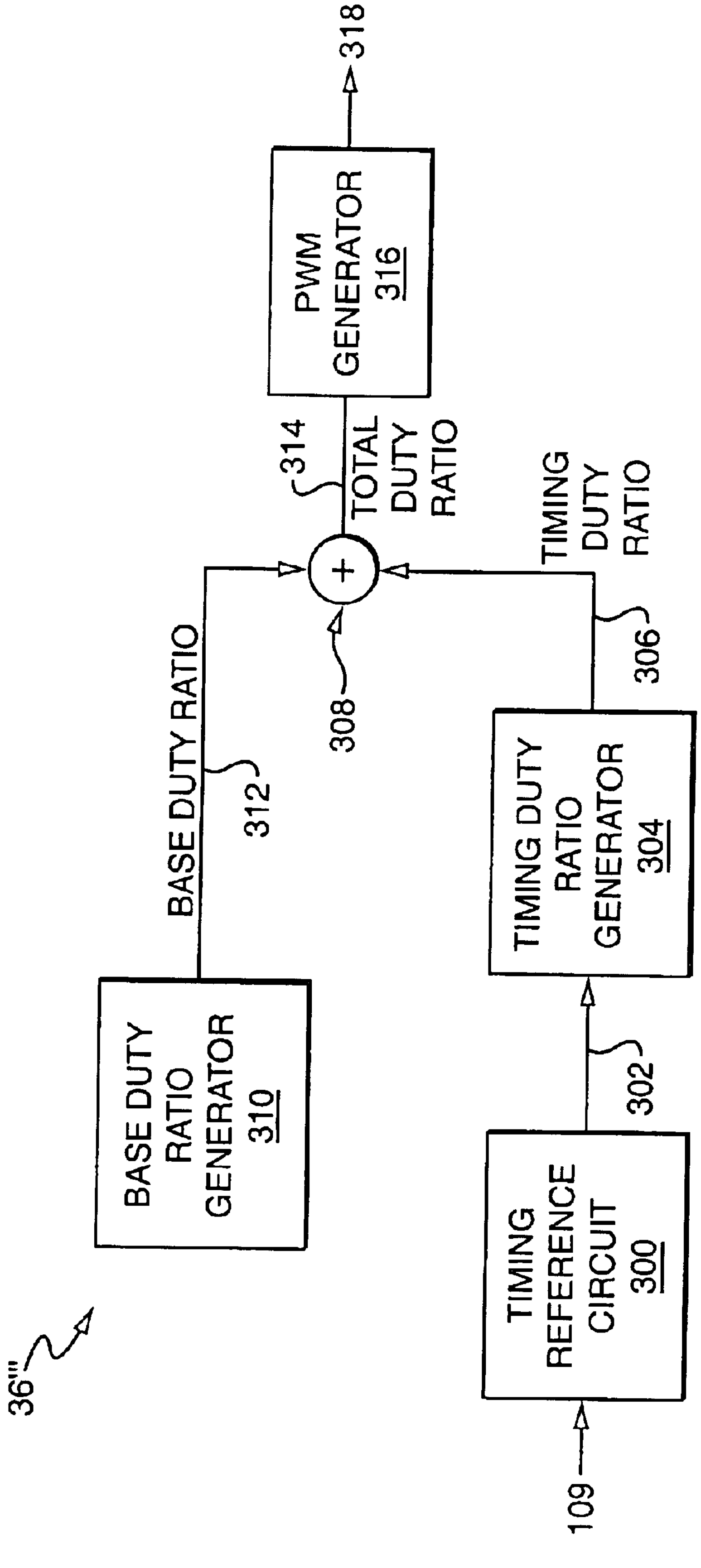
FIG. 8 is a block diagram of a controller including a PWM generator according to the present invention.

Turning now to FIG. 8, a controller 36'" (shown for a single phase), which may be similar to portions of controller 36 described above in conjunction with FIG. 2, includes a timing reference circuit 300 adapted to receive a timing reference event signal 109 at an input thereof. The timing reference circuit 300 provides a timing reference signal 302 to an input of a timing duty ratio generator 304. The timing duty ratio generator 304 provides a timing duty ratio signal 306 that is coupled to a first input of a bounded summation circuit 308. A base duty ratio generator 310 provides a base duty ratio signal 312 that is coupled to a second input of bounded summation circuit 308. The bounded summation circuit 308 provides a total duty ratio signal 314 that is coupled to an input of a PWM generator circuit 316. The PWM generator circuit provides a total duty rate PWM output signal 318. The controller 36'", shown for an individual phase in FIG. 8, implements the controlled pulse patterns described above in conjunction with FIG. 6 and below in FIG. 8A as the total duty rate PWM output signal 318 (also referred to as the controlled pulse sequence) that is synchronized to an angular rotor position for each respective phase of the alternator.

In operation, base duty ratio generator 310 generates a base duty ratio signal 312 that is common to all phases. The output of the base duty ratio generator 310 may be a function of one or more of alternator speed, field current, output voltage, electrical load, or other signals related to these signals. One base duty generator 310 can be used to provide the base duty ratio signal 312 to multiple controllers 36'" controlling multiple phases. The base duty ratio signal 312 can optionally be determined as a function of a state regulator and/or fault protection circuit (not shown) as described in co-pending applications, application Ser. Nos. 09/557,844 and 09/558,193.

For each phase, the respective timing reference event signal 109 establishes a reference time related to the alternator angular position or waveforms. In response to the timing reference event signal 109, the timing reference circuit 300 generates timing reference signal 302 and provides the timing reference signal 302 to the timing duty ratio generator 304. For multiple phases, total duty rate PWM output signals 318 from similar controllers 36'" (not shown) with different timing reference signals 302 will be provided to multiple control terminals (e.g. each of the gates of switching elements 58*b* (FIG. 2) and 58*c* (FIG. 2).

The timing reference signal 302 provides a set of timing marks to the timing duty ratio generator 304 after one or more events determined by the timing reference event signal 109. During each interval delineated by the timing marks, the timing duty ratio generator 304 provides a timing duty ratio signal 306. The timing duty ratio signal 306 represents a deviation of the total duty ratio 314 from the base duty ratio signal 312, and has a positive or negative value, and may be different in each interval. The values of the timing duty ratio signal 306 selected in each interval can be a function of one or more of alternator speed, field current, output voltage, electrical load, or other signals related to these signals.

The bounded summation circuit 308 sums the timing duty ratio signal 306 and the base duty ratio signal 312 up to a maximum of one and down to a minimum of zero. The bounded summation circuit 308 provides a total duty ratio signal 314 is the bounded sum of the base duty ratio signal 312 and the timing duty ratio 306. It represents the duty ratio of the switching element 58*a*–58*c* of the specified phase, and can vary from zero (switching element always off during a PWM cycle) to one (switching element always on during a PWM cycle). The total duty ratio signal 314 is provided to the PWM generator 316. It will be obvious to those with ordinary skill in the art that the same result can be achieved without placing a bound on the summation circuit output 314, provided that the PWM generator 316 responds to an over-range command (greater than 100%) with a 100% duty ratio output, and further provided that the PWM generator 316 responds to an under-range command (less than 0%) with a zero percent duty ratio output. It will be appreciated by those of ordinary skill in the art, the single PWM output signal 318 (for each phase) effectively provides the base duty ratio PWM signal combined with the timing reference pulse waveform as described above. PWM output signals from similar circuits with different phases (not shown) and corresponding different timing reference signals (not shown) are provided to multiple control terminals of the switching elements (i.e. multiple PWM output signals 318 drive a corresponding switching element 58*a*–58*c* of FIG. 2.

It should be appreciated that the controller 36''' is shown for a single phase and that the controller 36''' can be replicated and used to control multiple phases. In the case where multiple controllers are used, a phase-shifted timing reference signal 302 would be generated for each of the multiple phases. To achieve symmetrical operation among the phases, for example in a three phase alternator, phase "b" should be 120 fundamental electrical degrees later than phase "a"; phase "c" should be 240 degrees later than phase "a." Symmetrical operation can be achieved, for example, by using separate timing reference event signals 109 related to each phase respectively.

In one embodiment, the controller 36 (FIG. 2) includes three controllers 36''' (for a three phase machine) plus additional circuitry (not shown) which can for example provide a command signal to the field controller 26*a*. The controller 36 regulates the output power by coordinating control of the field current with the control provided by controllers 36'''. Additionally, by controlling the base duty ratio signal 312 and the timing duty ratio signal 306, controller 36''' enables an alternator system 19 (FIG. 2) to provide, over a range of alternator operating speeds, power levels which are greater than power levels provided by conventional alternator systems over a like range of alternator speeds.

It should be appreciated that the controller 36''' may be implemented in a variety of manners including but not limited to a custom integrated circuit. The particular techniques used to fabricate a practical controller will depend on a variety of factors including but not limited to the manufacturing cost, size and reliability of the resultant part.

Figure 8A:
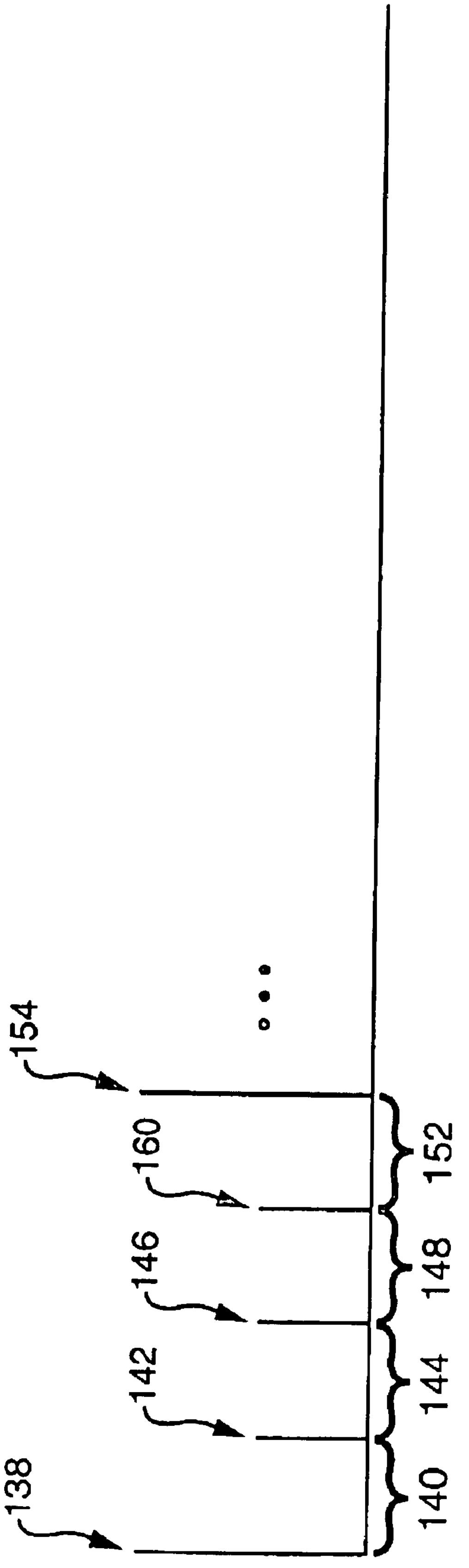
FIG. 8A is a timing diagram of a controller according to the present invention.

Referring now to FIG. 8A, the general timing of the output 318 (FIG. 8) provided by the PWM generator 316 (FIG. 8) to control switching elements 58*a*–58*c* (FIG. 2) is illustrated. It should be noted, that FIG. 8A shows a more general timing sequence than the timing sequence shown in FIG. 6D or FIG. 3A. The control signals provided to the switching elements 58*a*–58*c* can be described as falling within a series of intervals 140, 144, 148, and 152. As an example four time periods are here shown, but it should be appreciated that there could be fewer or more than four periods.

The timing series is initiated with an event 138. Event 138 can correspond, for example, to a zero crossing of a phase current as shown in FIG. 6A. Another possible event 138 is a given count from a shaft position encoder. Yet another event 138 can be a simple reference pulse from a Hall-effect sensor triggered by a magnetic feature on the generator rotor shaft. Event 138 is followed by a delay interval 140 which can vary from zero to a fractional period of a fundamental cycle defined by the fundamental electrical frequency ω of the alternator 25. During the delay interval 140, the gate of switching element 58*a* can be driven, for example, at any duty ratio, including zero or unity. The particular duty ratio used depends upon a variety of factors including but not limited to alternator speed, output voltage, electrical load on the alternator, field current, and angular position of the respective rotor.

During interval 144, a timing reference signal having a duration of from zero up to one-half of a fundamental electrical cycle is provided by PWM generator 316 (FIG. 8). It will be appreciated by those of ordinary skill in the art that the PWM generator 316 can provide a timing reference signal in more than one interval by the same method. Here, the balance of the period after interval 140 is illustrated as two intervals 148 and 152. During each of these intervals, the PWM duty ratio of the gate of switching element 58*a* can be any duty ratio including zero or unity. The duty ratio can be the same in several or all of the intervals or each may have a different duty ratio. The two intervals 148 and 152 can occur with both intervals including the output of the PWM generator 316 working at the same duty ratio, or with one interval running with duty ratio b and the other interval with duty ratio c, or one or the other interval having no output from the PWM generator 316. At time 154 the controller 36''' detects the next initiating event which synchronizes the next sequence of periods 140, 144, 148, and 152. Any two or more of periods 140, 144, 148, and 152 can have the same duration or all can have a different duration. Any of the periods 140, 144, 148, and 152 can have a zero duration. The operation of the PWM and pulse stage 58 (FIG. 2) can be empirically set by adjusting the timing parameters, the base duty ratios, and timing duty ratio within the periods 140, 144, 148, and 152. In other embodiments, thermal sensors can be used to further refine the output of the controller. It should be noted that the embodiments described above in FIG. 3A and FIG. 6B are special cases of the sequence of FIG. 8A. In those embodiments the number of intervals was three. In the embodiment of FIG. 3A, the base duty ratio in the first and third intervals is zero. In the embodiment of FIG. 6B, the base duty ratio in the first and third intervals was the same non-zero value. The use of the pulse in interval 144 is effective at increasing output power at operating conditions, for example at engine idle speeds, where other methods (e.g. use of base duty ratio PWM signals alone) are less effective. The disadvantage of the timing reference pulse in interval 144 is increased stator current or rms current and ripple. Although the embodiment described in FIG. 8 allows the possibility of more than one interval 144 having a timing reference pulse, it is expected that the use of timing reference pulses will be practically restricted to one timing reference pulse per switching element 58*a*–58*c* per electrical cycle (in the three phase example), with the start time and duration of that one timing reference pulse being selected for to maximize power improvement and minimize undesired increased stator current, rms current, ripple and heat.

One embodiment includes an optimized time delay interval 140, followed by a timing reference pulse interval 144, followed by an interval 148 with a constant, non-zero base duty ratio PWM component, followed by an interval 152 having a smaller, perhaps zero, duty ratio PWM component.

Figure 9:
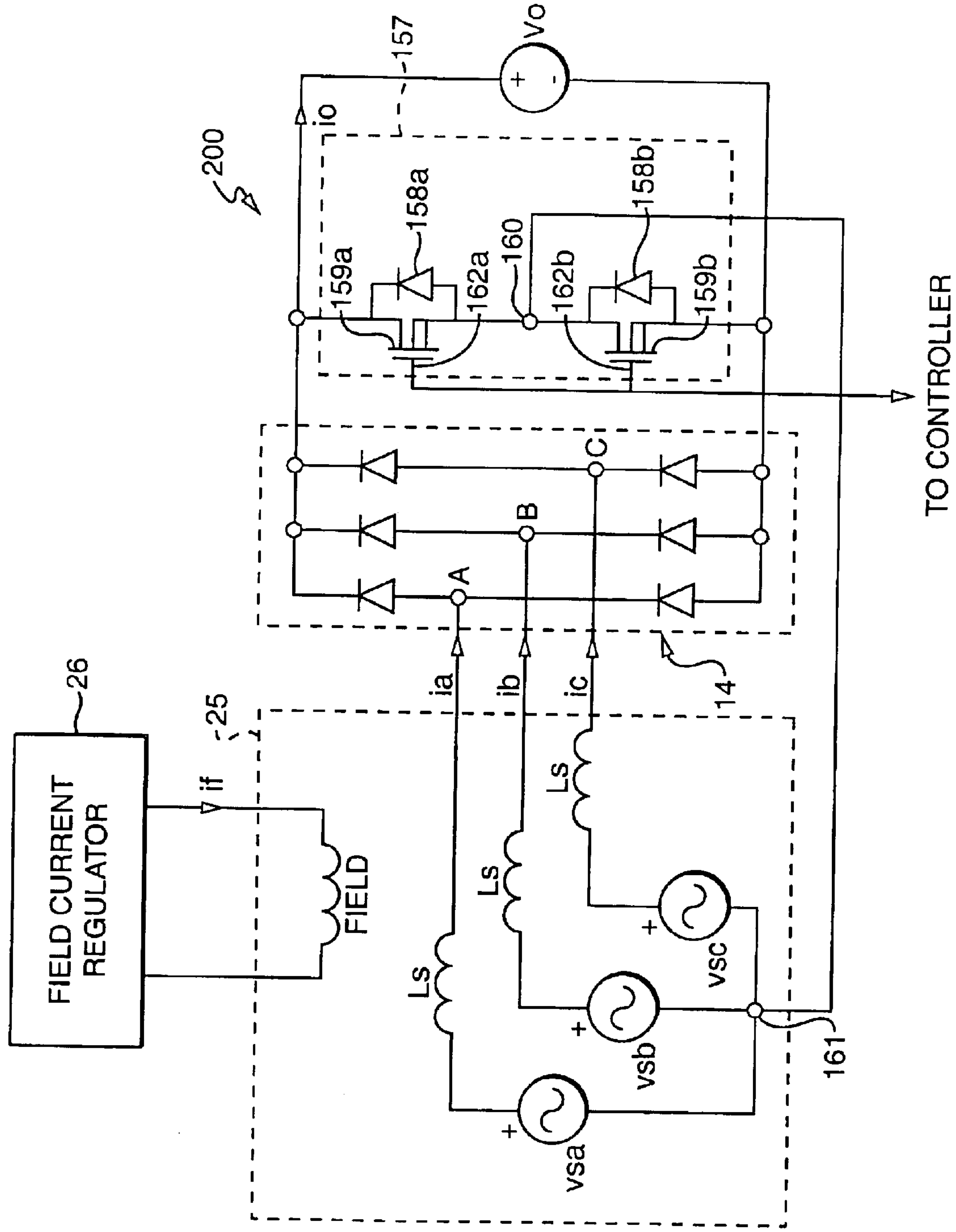
FIG. 9 is a schematic diagram of an alternator system with neutral switches according to the present invention.

Referring now to FIG. 9, in which like elements of FIG. 1B are provided having like reference designations, an alternator system 200 which does not require a full switched-mode rectifier of the type illustrated in FIG. 2 is shown. The alternator system 200 of FIG. 9 is similar to the diode-rectified alternator system with booster diodes described above in conjunction with FIG. 1B. Alternator system 200, however, includes a leg 157 having diodes 158*a*, 158*b* coupled as shown. Each of the diodes 158*a*, 158*b* has a switching element 159*a*, 159*b* coupled thereto. A node 160 on leg 157 is coupled to a neutral point 161 of the alternator 25. A controller (not shown) is adapted to provide control signals to gate control terminals 162*a* and 162*b* of switching elements 159*a* and 159*b* respectively. It should be appreciated that the switching elements 159*a*, 159*b* could be provided as any type of switching device including but not limited to a FET and that the diodes 158*a*, 158*b* could be physically provided as part of switching elements 159*a*, 159*b*, for example, if the switching elements 159*a*, 159*b* are MOSFETS, the diodes 158*a*, 158*b* are intrinsic body diodes.

In operation, the switching elements 159*a*, 159*b* in the leg 157 are modulated (e.g., at three times the fundamental electrical frequency provided by a waveform as described in conjunction with FIG. 8A) to modify the voltage waveforms applied to the stator windings such that more output power is achieved through improved magnitude and phase of the fundamental component of the phase currents. Switching element 159*a* is modulated off and on in a PWM mode with a suitable duty cycle.

By modulating the node 160 with the proper phase and pulse pattern, the phase currents and rectifier bridge timing are changed so as to improve the magnitude of the phase currents and/or the phase of the fundamental phase currents with respect to the back emf voltages so that more power is generated. The effect is similar and analogous to introduction of cyclic modulation of the line-to-line voltages, as is performed with the various embodiments using the circuit of FIG. 2, except the circuit of FIG. 9 modulates line-to-neutral voltages.

In addition, if the back emf contains a significant third harmonic component, additional power can be extracted via the third harmonic even at idle speeds, which is not possible in conventional systems. To understand this action, consider first the action of the generator as a third harmonic source. The third harmonic components of voltages Vsa, Vsb and Vsc are in phase, so the three sources will respond identically to any action on their terminals and, thus, may be considered a single source with one terminal at node 161 and the other being any or all of nodes a, b, and c. As is well understood in the art, without a neutral connection the diode bridge responds only to line-to-line voltages, which do not contain third harmonic components, so no third harmonic current flows due to the diode bridge. Consider first the case where the third harmonic voltage is negative. Switching elements 159*b* and diode 158*a* form a boost converter set. It is possible to inject current into source Vo by boost converter action as is known in the art. Switching element 159*b* is first turned on, short circuiting the third harmonic source allowing a current to build up. Switching element 159*b* is then opened, forcing the component of current thus established to return to the source through a path including diode 158, source Vo and one or more of the bottom diodes of the diode bridge 14. When the third harmonic voltage is positive, switch 159*a* and 158*b* comprise an equivalent boast converter set, with analogous action. By operating switch elements 159*a* and 159*b* in a PWM mode at appropriate time relative to the third harmonic voltage, flow and rectification of third harmonic currents are achieved even when the magnitude of the third harmonic voltage is not enough to forward bias diodes 158*a*, 158*b*. Conventional rectifier circuits provide third harmonic currents only when the third harmonic voltage is large enough to forward bias the booster diodes without switching elements.

Timing information provided by the controller (not shown) coupled to the gate control terminals 162*a*, 162*b* of the switches 159*a*, 159*b* can be derived from the changes in phase current sign or equivalently from the commutation times of the diode bridge 14 or from machine angular position as determined by a shaft encoder, resolver, or from a Hall-effect sensor triggered by a magnetic feature on the generator rotor shaft or other input. The embodiment as illustrated in FIG. 9 provides more power at selected low speed (e.g. idle speed). In this case, the switching elements 58*a*, 58*b*, and 58*c* (as shown in FIG. 2) are not required. Other versions of this neutral leg modulation embodiment are also possible, as illustrated in half bridge embodiments in FIG. 10 and FIG. 11.

Figure 10:
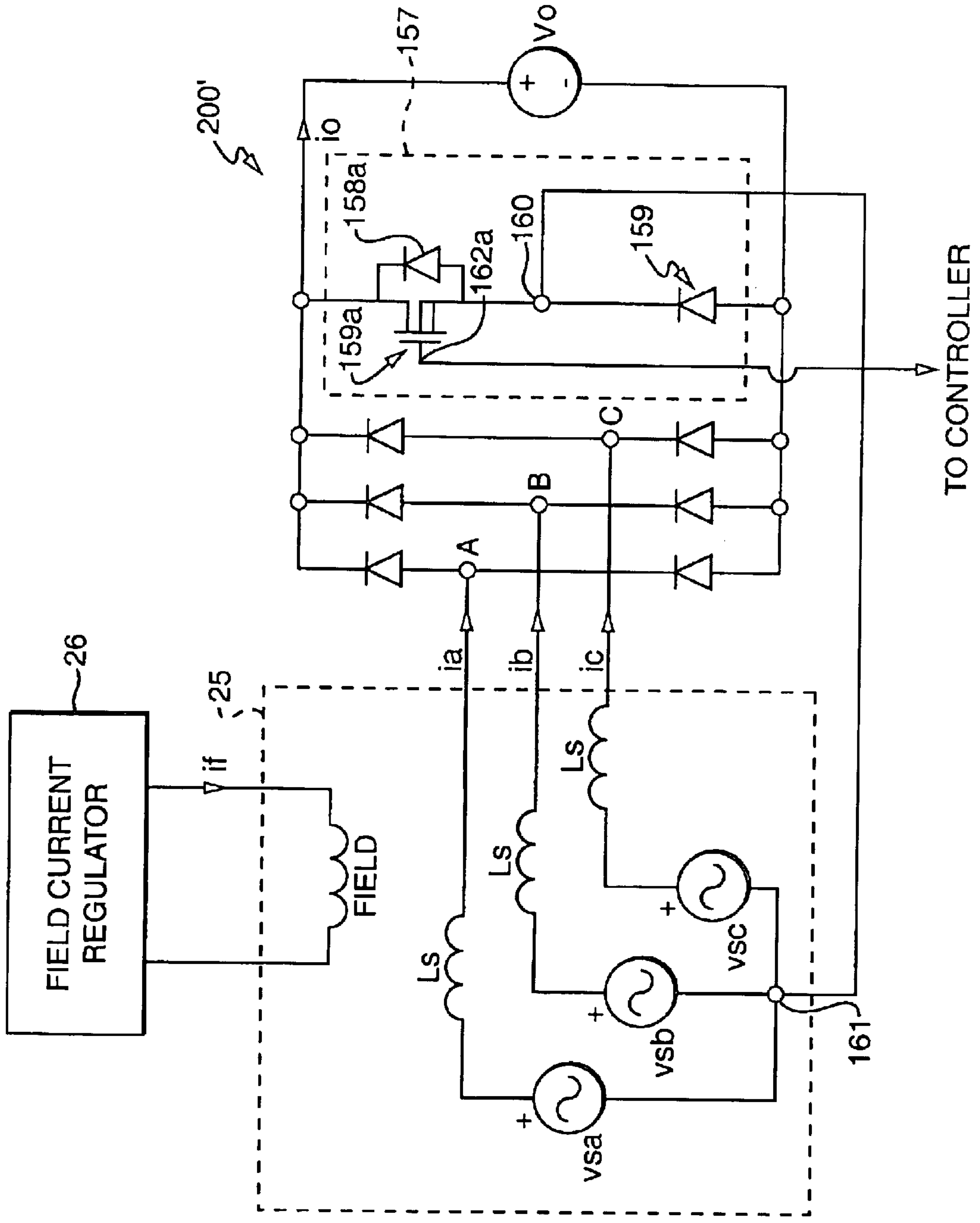
FIG. 10 is a schematic block diagram of an alternator system with neutral leg switch/diode pair according to the present invention.
Figure 11:
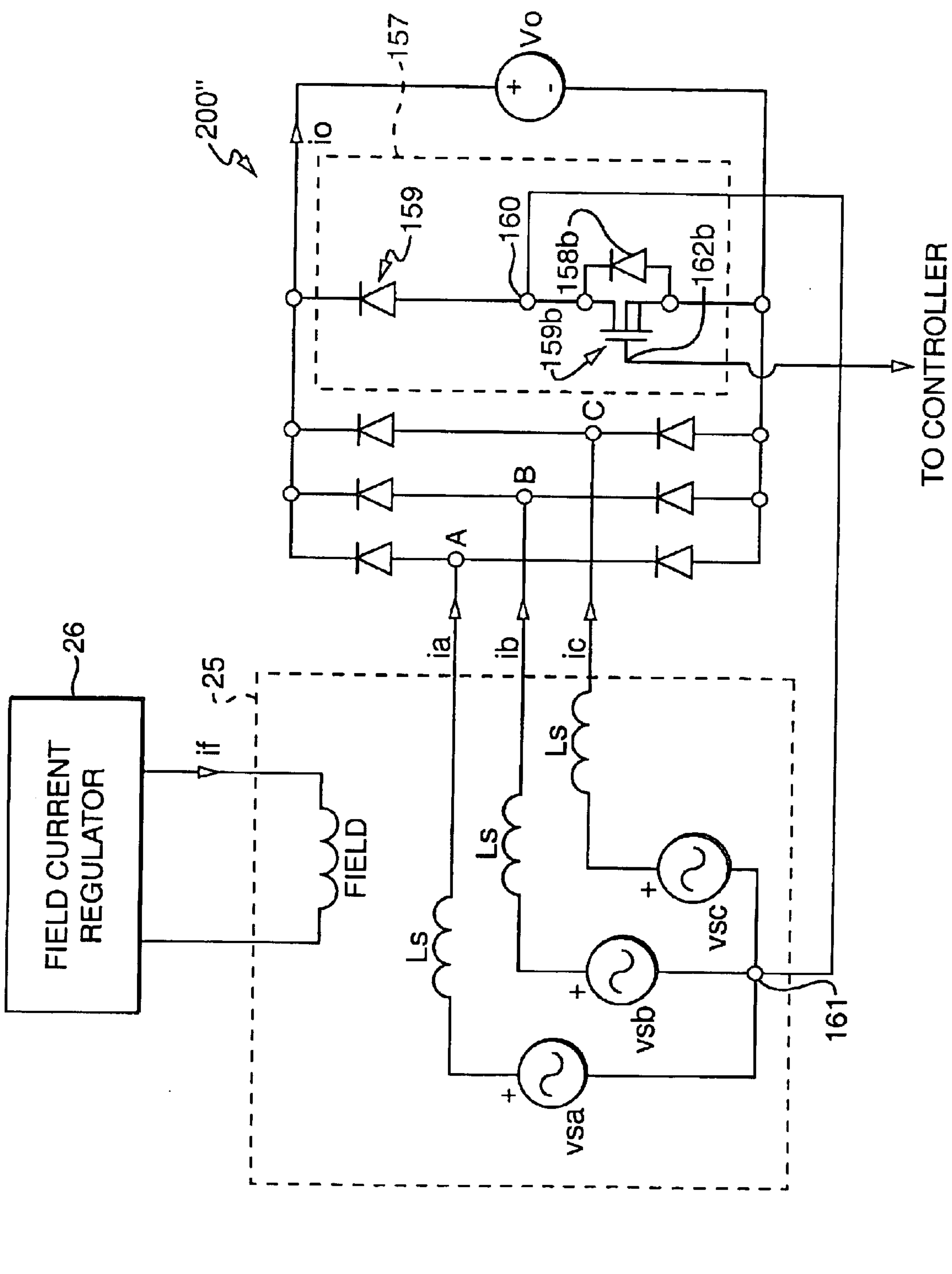
FIG. 11 is a schematic block diagram of an alternator system with neutral leg switch/diode pair according to the present invention.

Referring now to FIG. 10, second switch 159*b* and diode 158*b* have been replaced by a single diode 159. In FIG. 11, first switch 159*a* and diode 158*a* have been replaced with a single diode 159. The principal benefit of the embodiments of FIGS. 10 and 11 is that the component cost to implement them will be lower than FIG. 9 because a diode 159 is substituted for a switches 159*a*–159*b* and diodes 158*a*–158*b* respectively. If an application requires less additional power than the embodiment of FIG. 9 provides, the embodiments of FIG. 10 or 11 provide the required additional power at lower cost. It will be appreciated by those of ordinary skill in the art, that the neutral leg modulation can be combined with the controller and rectifier structure of FIG. 2.

Figure 12:
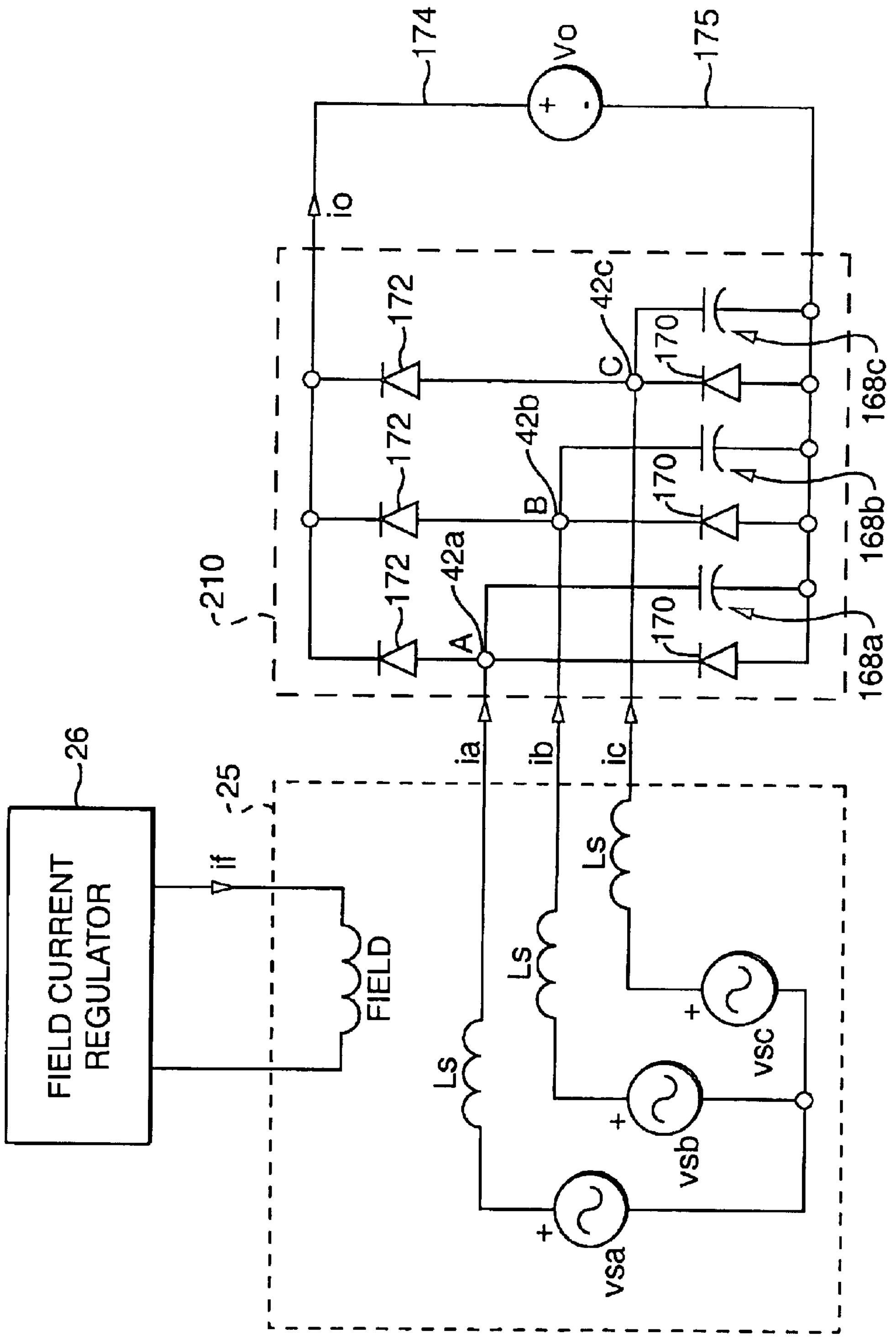
FIG. 12 is a schematic block diagram of a diode rectified alternator system with capacitors at the phase nodes according to the present invention.
Figure 13:
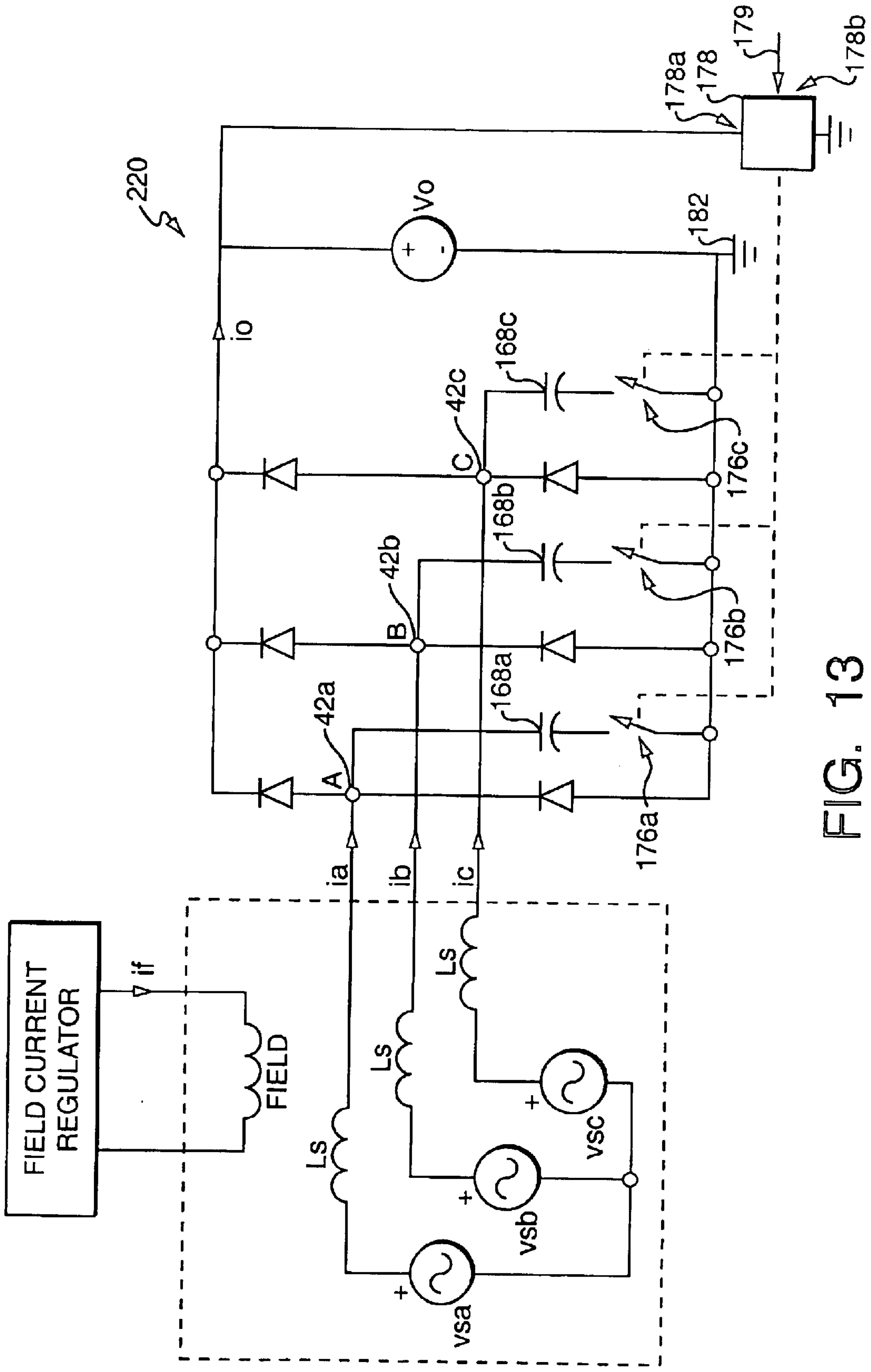
FIG. 13 is a schematic diagram of a diode rectified alternator system with capacitors and switches connected at the phase nodes according to the present invention.
Figure 14:
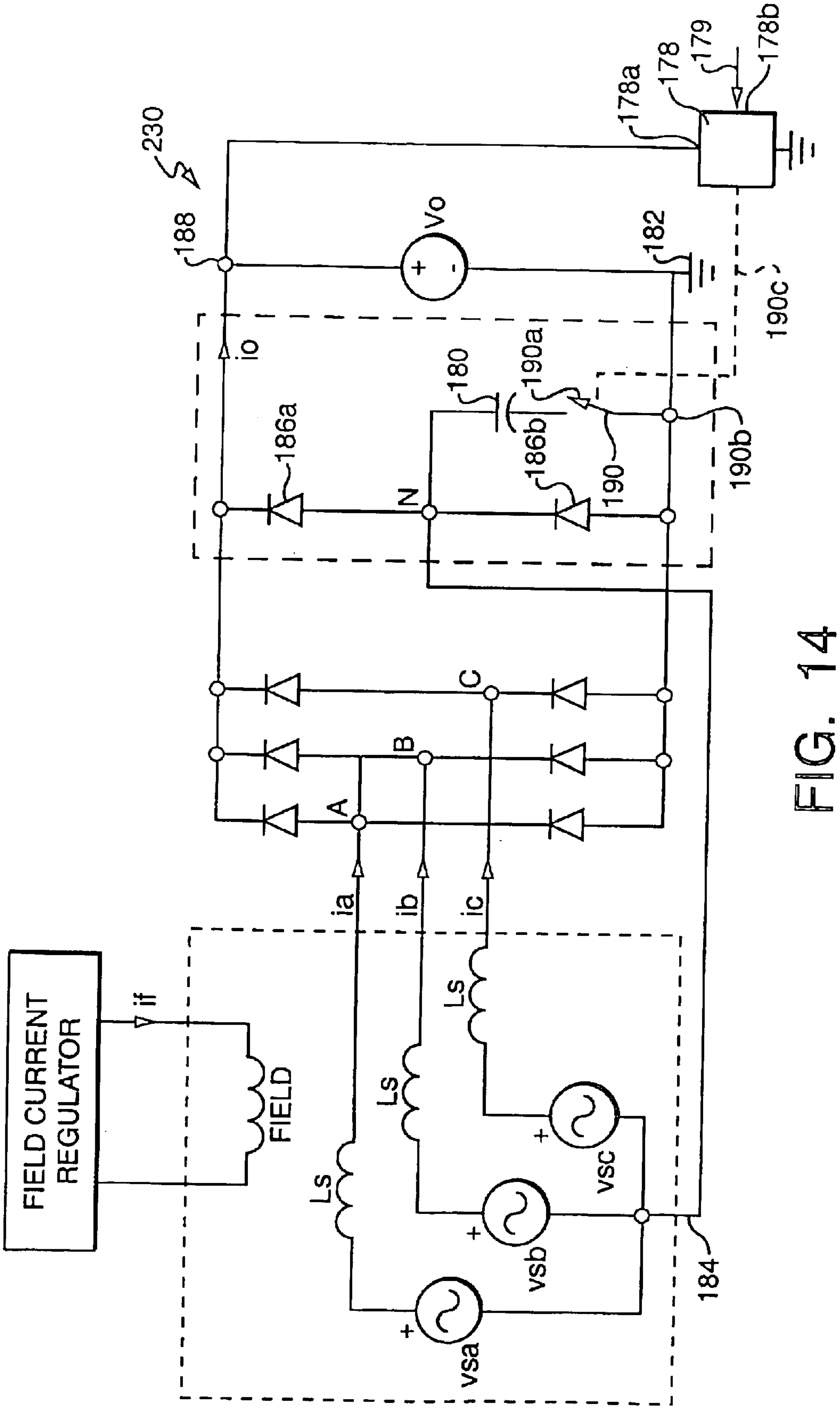
FIG. 14 is a schematic diagram of a diode rectified alternator system with capacitor, switch, and boost diodes connected to the machine neutral according to the present invention.

Referring now to FIGS. 12–14, in which like elements of FIGS. 1A and 1B are provided having like reference designations, embodiments utilizing reactive elements will now be described. As described below, additional circuit elements can be added to a rectifier circuit that change the stator winding voltages and rectifier conduction times, resulting in increased output power generated by diode-rectified alternator systems. The effect of these circuits is similar to the use of switches 58*a,b,c* of FIG. 2 In the mode described in FIG. 3. In FIG. 3, the switches are used to present the line-to-line terminals of the alternator with a zero voltage for a limited period, once a cycle for each line-to-line pair. The capacitors in FIG. 12 present the line-to-line terminals with a lower-than-otherwise voltage (not zero but starting at zero) once a cycle for each line-to-line pair. The capacitors thus work approximately but not identically like the switches when operated as in FIG. 3. As with the embodiment describe in FIGS. 2 and 3, the improvement occurs at low speeds (idle or nearby) where other methods are less effective.

One such embodiment is illustrated in FIG. 12. A rectifier circuit 210 includes reactive elements 168*a*–168*c*, here for example capacitors, which are connected respectively between each phase winding and ground. When the current in a phase winding changes from negative to positive, the bottom diode 170 for that phase turns off, but the respective one of the capacitors 168*a*–168*c* must be charged up from zero to the output voltage before the top diode 172 turns on. Similarly, a reciprocal capacitor discharge period occurs when the phase current changes from positive to negative. The charge/discharge periods of the capacitors 168*a*–168*c* modify the voltage waveform applied to the phase windings in a manner that improves the output power at idle. The effects of the capacitor charging times are somewhat analogous to the effects of the additional input port 122 on the timing of the switching elements 58*a*–58*c* (FIG. 2) in the switched-mode rectifier embodiment. The values of capacitors 168a–168c are selected to trade off improved output power with capacitor requirements, output ripple, and machine heating.

Figure 12A:
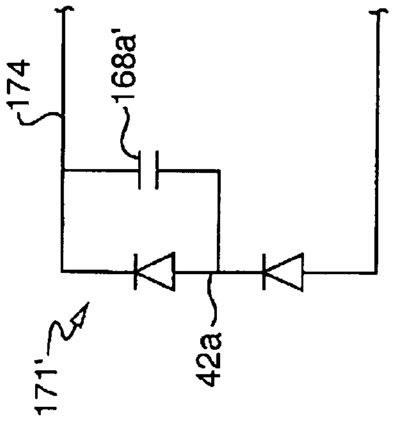
FIGS. 12A, 12B, 12C, and 12D are series of schematic diagrams of circuit variations of FIG. 12 illustrating different types of circuit topologies which can be used in accordance with the present invention.

Alternate embodiments of the rectifier circuit of FIG. 12 are shown in FIGS. 12A–12D. Referring to FIG. 12A, a rectifier circuit 210' (shown for a single phase) includes a capacitor 168a' coupled between the connection 42a of a phase winding and the positive output terminal 174 of the rectifier circuit 210'.

Figure 12B:
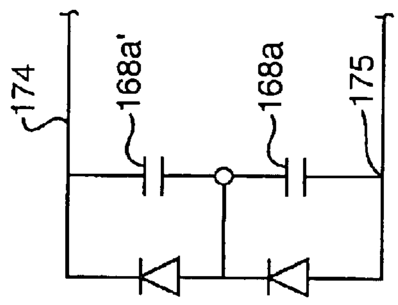
Figure 12C:
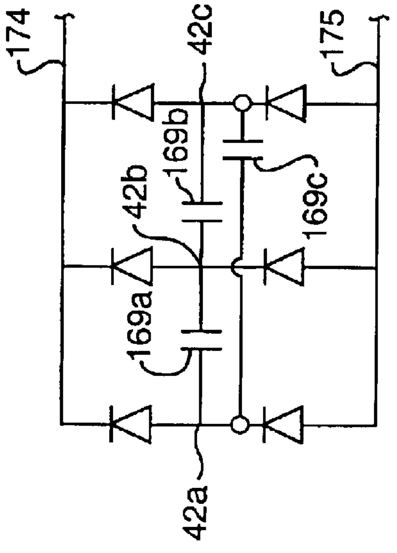

Referring to FIG. 12B, a rectifier circuit 210" (shown for a single phase) includes the capacitor 168a' as described in FIG. 12A and the capacitor 168a as described in FIG. 12. Referring to FIG. 12C, a rectifier circuit 210'" (shown for three phases and also referred to as a delta configuration) includes a reactive element 169a, here for example a capacitor, coupled between the connection 42a of a phase winding "a" and the connection 42b of a phase winding "b", a capacitor 169b coupled between the connection 42b of the phase winding "b" and the connection 42c of a phase winding "c", and a capacitor 169c coupled between the connection 42a of the phase winding "a" and the connection 42c of the phase winding "c".

Figure 12D:
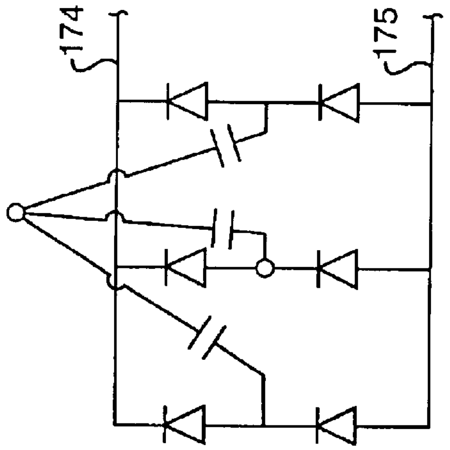

Referring to FIG. 12D, a rectifier circuit 210"" (shown for three phases and also referred to as a "Y" configuration 210"") includes a capacitor 169a coupled between the connection 42a of a phase winding "a" and a common connection, a capacitor 169b coupled between the connection 42b of the phase winding "b" and the common connection, and a capacitor 169c coupled between a connection 42c of the phase winding "c" and the common connection. In the "Y" configuration, $3^{rd}$ harmonic power cannot be extracted, but $3^{rd}$ harmonic power can be extracted in the neutral leg capacitor embodiment of FIG. 14. It should also be appreciated that the optimal number of turns on the alternator stator for a specified output voltage may be somewhat different with the shown configuration than is conventionally utilized.

In one test, a standard Ford 130 A alternator was operated to thermal steady state at an idle speed of 1670 rpm and full field, and produced an output power of 943 W. The alternator system was then adapted to include the rectifier circuit 210 of the embodiment shown in FIG. 12. Capacitors 168a–168c, for example have a capacitance of 423 $\mu$F per phase. The capacitance value was selected as a reasonable tradeoff between power improvement, capacitor size, and machine heating. The alternator system then achieved a steady-state output power of 1037 W, a 10% improved output power at idle conditions compared to the conventional system. The internal machine temperature rise is higher with the capacitors 168a–168a in place, but is still lower than occurs at some other operating points under normal operating conditions.

Referring now to FIG. 13 in which like elements of FIG. 12 are provided having like reference designations, a rectifier circuit 220 includes a plurality of reactive elements 168a–168c, here for example capacitors, coupled to a respective phase winding output 42a–42c and coupled to a first terminal of a plurality of switches 176a–176c respectively (generally referred to as switch 176). Each switch 176 includes a control terminal and a second terminal coupled to a ground reference potential 182. The control terminal of each switch 176 is coupled to a controller 178. Controller 178 further includes an input port 178a which is coupled to the positive output terminal 188 and an input port 178b adapted to receive a sensor output 179. The sensor output includes but is not limited to a speed sensor (not shown) and an output voltage sensor (not shown).

In operation, the switches 176a–176c are controlled by a controller 178 which measures the output voltage Vo at input port 178a and receives a speed sensor and/or output voltage signal at input port 178b. This allows the required capacitor ratings to be minimized, and allows the capacitors to be easily protected against load dump or other transient conditions. Each switch 176, for example a relay, transistor or triac, selectively couples the respective reactive element 168 to the ground reference potential 182 under conditions (such as a certain speed range or voltage output) as determined by the operation of the controller 178. By modifying the conduction times for the diodes in the rectifier circuit 220, the controller 178 increases output power under certain conditions (for example alternator operation at low speeds). Each switch 176 can drop the reactive element 168 out of the circuit as a function of higher speeds to avoid damage from higher load dump voltages.

Now referring to FIG. 14 in which like elements of FIG. 13 are provided having like reference designations, a rectifier circuit 230 includes a reactive element 180 coupled to a machine neutral leg 184 and coupled to a first terminal 190a of a switch 190. Switch 190 includes a control terminal 190c and a second terminal 190b coupled to a ground reference potential 182. The rectifier circuit 230 further includes a booster diode 186a coupled between the neutral leg 184 and a positive output terminal 188, and a booster diode 186b coupled between the neutral leg 184 and the ground reference potential 182. The control terminal of the switch 190 is coupled to a controller 178. Controller 178 further includes an input port 178a which is coupled to the positive output terminal 188 and an input port 178b adapted to receive a sensor output 179. The sensor output includes but is not limited to a speed sensor (not shown) and an output voltage sensor (not shown).

In operation, the reactive element 180, here a capacitor, causes a neutral voltage to be charged up and down , modifying the winding voltages so that more output power is achieved through improved magnitude and phase of the fundamental current. In addition, in cases where the back emf contains a significant third harmonic component, additional third harmonic output power can be extracted even at idle speeds (which is not possible in prior-art systems). The switch 190, for example a relay, transistor or triac, selectively couples the reactive element 180 to the ground reference potential 182 under conditions (such as a certain speed range or voltage output) as determined by the operation of the controller 178. By modifying the conduction times for the booster diodes 186a and 186b the controller 178 increases output power. The switch 190 can drop the capacitor 180 out of the circuit as a function of higher speeds to avoid damage from higher load dump voltages. It should be appreciated that there are several equivalent circuits which perform the same control functions as shown in FIGS. 14–14C.

Figure 14B:
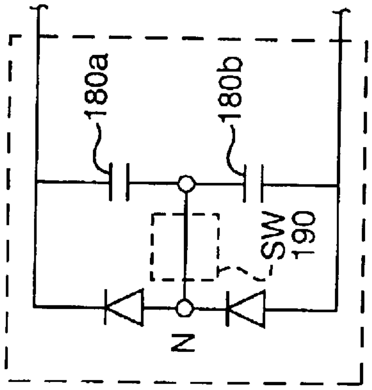
FIGS. 14A–14C are a series of schematic diagrams of circuit variations of FIG. 14 illustrating different types of circuit topologies which can be used in accordance with the present invention.
Figure 14C:
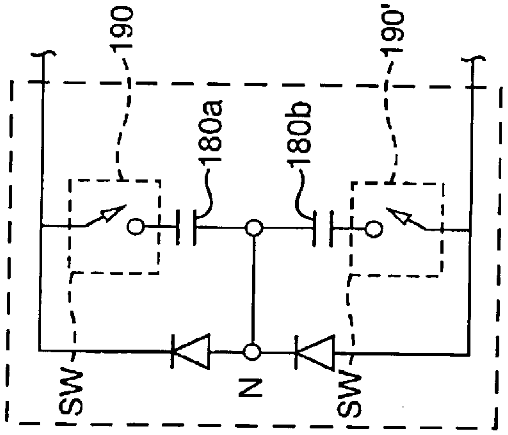
Figure 14A:
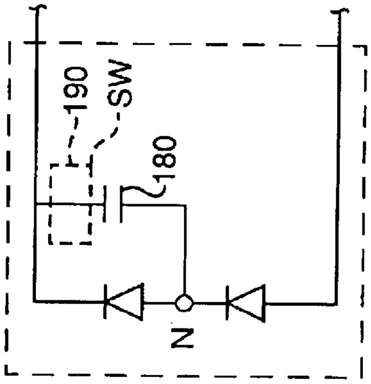

Alternative embodiments of the rectifier circuit 230 of FIG. 14 utilizing different capacitor 180 arrangements FIGS. 14A–14C. As shown in FIG. 14a, a switch 190 is located between the active device and the output of the system. In FIG. 14B a switch 190 is located between phase winding output and the common point of the capacitors for that phase. In FIG. 14C, a first switch 190 is located in the same arrangement as the switch 190 shown in FIG. 14a, and a second switch 190' is located between a second capacitor 180b and a ground potential.

Those of ordinary skill in the art will appreciate of course that for purposes of the present invention other embodiments are clearly possible, including those that utilize other capacitor connections or combinations of reactive elements.

It will be now recognized by those of ordinary skill in the art that this same approach may be used with other switched-mode rectifier structures, such as the boost, Cuk, SEPIC, and push-pull rectifier structures.

In other embodiments, additional circuit elements and/or controls are introduced which modify the voltages applied to the stator windings. These changes in turn modify the currents flowing in the windings, including changes in harmonic content, resulting in changes in rectifier conduction times and increased output power. Increased power is achieved through increased magnitude and/or improved phase of the fundamental component of the phase currents. In some embodiments, additional output power is achieved through increases in third (or other) harmonic components of the phase currents.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. An alternator system, having an alternating current (ac) voltage source having at least one rotor, said ac voltage source having an output voltage controllable by a field current thereof and an output, said alternator system comprising:

a switched-mode rectifier (SMR) coupled to the ac voltage source and having an output port coupled to an output of the alternator system; and a controller coupled to said switched-mode rectifier so as to provide a controlled pulse sequence synchronized with an angular rotor position of the ac voltage source to activate and deactivate said switched-mode rectifier.

2. The system of claim 1 wherein the controller comprises a PWM generator having a first input adapted to receive a total duty ratio signal synchronized with an angular rotor position of the ac voltage source.

3. An aternator system, having an alternating current voltage source having at least one rotor, said ac voltage source having an output voltage controllable by a field current thereof and an output, said alternator system comprising:

a switched-mode rectifier (SMR) coupled to the ac voltage source and having an output port coupled to an out put of the alternator system; and a controller coupled to said switched-mode rectifier so as to provide a controlled pulse sequence synchronized with an angular rotor position of the ac voltage source to activate and deactivate said switched-mode rectifier wherein the controller comprises:

a PWM generator having a first input adapted to receive a total duty ratio signal synchronized with an angular rotor position of the ac voltage source, a bounded summation circuit having a first input, a second input, and an output coupled to the first input of the PWM generator;

a base duty ratio generator coupled to the first input of the bounded summation circuit; and a timing duty ratio generator coupled to the second input of the bounded summation circuit.

4. The system of claim 3 wherein the timing duty ratio generator comprises a first input coupled to an output of a timing reference circuit adapted to receive a timing reference event signal synchronized with the angular rotor position of the ac voltage source.

5. The system of claim 4 wherein the timing reference event signal is provided by one of:

a detection of a polarity change in a phase current of said voltage source;

a given count from a position encoder coupled to a shaft of the rotor of said voltage source; and a polarity of the voltage across the switched-mode rectifier.

6. An alternator system having an alternating current (ac) voltage source having at least one rotor, said ac voltage source having an output voltage controllable by a field current thereof and an output, said alternator system comprising:

a switched-mode rectifier (SMR) coupled to the ac voltage source and having an output port coupled to an output of the alternator system; and a controller coupled to said switched-mode rectifier so as to provide a controlled pulse sequence synchronized with an angular rotor position of the ac voltage source to activate and deactivate said switched-mode rectifier wherein the controlled pulse sequence comprises a plurality of intervals, the plurality of intervals repeating at a fundamental electrical frequency of said voltage source, each such interval having an adjustable duration and comprising a pulse width modulation (PWM) signal provided by a PWM generator having an input coupled to a summation of a base duty ratio signal having a duty cycle adjustable from zero to unity and a timing duty ratio signal synchronized with the angular rotor position of the ac voltage source.

7. The system of claim 1 wherein a timing reference pulse of the controlled pulse sequence is triggered by an adjustable delay initiated by an event related to a fundamental electrical frequency of said voltage source.

8. An alternator system having an alternating current (ac) voltage source having at least one rotor, said ac voltage source having an output voltage controllably by a field current thereof and an output, said alternator system comprising:

a switched-mode rectifier (SMR) coupled to the ac voltage source and having an output port coupled to an output of the alternator system; and a controller coupled to said switched-mode rectifier so as to provide a controlled pulse sequence synchronized with an angular rotor position of the ac voltage source to activate and deactivate said switched-mode rectifier wherein the controlled pulse sequence comprises a plurality of intervals, the plurality of intervals repeating at a fundamental electrical frequency of said voltage source, each such interval having an adjustable duration and comprising the logical combination of a pulse width modulation (PWM) signal having a duty cycle adjustable from zero to unity and a timing reference pulse signal having a predetermined pulse duration interval less than a fundamental electrical period of said voltage source.

9. The system of claim 8 wherein an initial one of the plurality of intervals is aligned with a timing reference event signal, the pulse signal duration of the initial interval has a zero duration, such that the initial interval provides a pulse delay interval having a predetermined duration, such that a first timing reference pulse signal of the plurality of intervals occurs after the pulse delay interval following the reference signal timing event signal.

10. The system of claim 9 wherein the timing reference event signal is provided by one of:

a detection of a polarity change in a phase current of said voltage source;

a given count from a position encoder coupled to a shaft of the rotor of said voltage source; and a polarity of the voltage across the switched-mode rectifier.

11. An alternator system having an alternating current (ac) voltage source having at least one rotor, said ac voltage source having an output voltage controllably by a field current thereof and an an output, said alternator system comprising:

a switched-mode rectifier (SMR) coupled to the ac voltage source and having an output port coupled to an output of the alternator system; and a controller coupled to said switched-mode rectifier so as to provide a controlled pulse sequence synchronized with an angular rot or position of the ac voltage source to activate and deactivate said switched-mode rectifier wherein said controller comprises a microprocessor.

12. The system of claim 11 wherein said microprocessor is a programmable microprocessor operable in response to stored program instructions; and said alternator system further comprises a lookup table which can be interrogated by said programmable microprocessor, to provide information in response to said event, for selectively generating said controlled pulse sequence.

13. An alternator system having an alternating current (ac) voltage source having at least one rotor, said ac voltage source having an output voltage controllable by a field current thereof and an output, said alternator system comprising:

a switched-mode rectifier (SMR) coupled to the ac voltage source and having an output port coupled to an output of the alternator system; and a controller coupled to said switched-mode rectifier so as to provide a controlled pulse sequence synchronized with an angular rotor position of the ac voltage source to activate and deactivate said switched-mode rectifier wherein said controller comprises:

a pulse timing reference circuit;

a timing reference pulse generator coupled to said pulse timing reference circuit; and a logic element having a first input coupled to an output of said timing reference pulse generator, and having an output coupled to said switched-mode rectifier.

14. The system of claim 13 wherein said controller further comprises a base duty ratio pulse width modulation (PWM) generator having an output coupled to a second input of said logic element.

15. The system of claim 14 wherein the pulse sequence further comprises a plurality of adjustable time periods, wherein each of the plurality of adjustable time periods comprises the output of the base duty ratio PWM generator operating at a predetermined duty ratio for the respective period.

16. The system of claim 14 wherein said base duty ratio PWM generator has an input coupled to a sensor which senses a parameter of a first one of said ac voltage source and an engine and in response thereto said sensor provides a signal representative of the parameter to said base duty ratio PWM generator.

17. The system of claim 16 wherein in response to signal information provided thereto, said base duty ratio PWM generator provides a base duty ratio PWM signal to said logic element which causes the switched-mode rectifier to operate with a particular duty cycle selected to provide a controlled transformation of voltage and current between terminals of the ac voltage source and output terminals of the alternator system and to convert an ac voltage from the ac voltage source to a direct current (dc) voltage.

18. The system of claim 16 wherein said sensor senses at least one of an ac voltage source speed, an ac voltage source fundamental electrical frequency, and an ac voltage source back emf.

19. The system of claim 18 wherein said sensor comprises:

a sense winding electromagnetically coupled to the alternating current ac voltage source; and a back emf detection circuit.

20. The system of claim 16 wherein said sensor is coupled to an engine and said sensor senses at least one of an engine speed, and an engine frequency.

21. The system of claim 1 further comprising a field controller comprising:

an input port coupled to an output of the controller; and an output port coupled to an input port of a field current regulator to provide the field current to said ac voltage source.

22. The system of claim 16 wherein in response to the sensor sensing an output voltage having a value which is less than a reference value, the controller provides a first output signal to increase the field current to said ac voltage source.

23. The system of claim 21 wherein said controller senses an output voltage level at the output of said alternator system, and compares the sensed output voltage level to a reference value and provides control signals to said field controller in response to the comparison.

24. The system of claim 23 wherein in response to the sensed output voltage being less than the reference value the controller provides a first output signal to increase the field current to said ac voltage source.

25. The system of claim 1 further comprising a fault protection controller having an input port coupled to an output of the alternator system and having an output port coupled to an input of said controller.

26. The system of claim 1 further comprising a thermal sensor disposed on the ac voltage source and having an output port coupled to a thermal sensor input port of said controller.

27. A method for controlling an alternator having an alternating current (ac) voltage source, an output voltage controllable by a field current thereof and having a rectifying circuit including a switched mode rectifier, the method comprising:

sensing an event synchronized with an angular rotor position of the ac voltage source;

generating a controlled pulse sequence in response to sensing the event; and providing said controlled pulse sequence to control the switched mode rectifier.

28. A method for controlling an alternator having an alternating current (ac) voltage source, an output voltage controllable by a field current thereof and having a rectifying circuit including a switched mode rectifier, the method comprising:

sensing an event synchronized with an angular rotor position of the ac voltage source;

generating a controlled pulse sequence in response to sensing the event; and providing said controlled pulse sequence to control the switched mode rectifier wherein generating a controlled pulse sequence comprises:

providing a base duty ratio signal;

providing a timing duty ratio signal;

summing the base duty ratio signal and timing duty ratio signal to provide a total duty ratio signal; and generating a PWM signal having the total duty ratio.

29. The method of claim 28 wherein said event is a timing mark derived from at least one of engine speed, engine frequency, an alternating current (ac) voltage source speed, an ac voltage source frequency and an ac voltage source back emf.

30. The system of claim 1 wherein:

said AC voltage source comprises a plurality of phase winding outputs; and said SMR comprises:

a plurality of SMR connections each of said SMR connections coupled to at least one of said plurality of phase winding outputs;

a rectifier having a positive terminal and a negative terminal, coupled to said ac voltage source;

a controller so as to provide a controlled pulse sequence:

a first switch having a first terminal coupled to a neutral leg, a second terminal coupled to a first reference potential and wherein said first switch is coupled to said controller, such that the controller activates and deactivates said first switch.

31. The system of claim 30 wherein the first switch is provided as field effect transistor.

32. The system of claim 30 wherein the first reference potential comprises at least one of:

a ground reference potential;

the negative output terminal; and the positive output terminal.

33. The system of claim 30 further comprising a second switch coupled to the neutral leg and having an output port coupled to a second reference potential such second reference potential being different from the first reference potential and wherein said second switch is coupled to said controller, such that the controller activates and deactivates said first and second switches.

34. The system of claim 33 wherein the first and second reference potentials comprise at least one of:

the negative output terminal; and the positive output terminal.

35. The system of claim 33 wherein the first switch comprises a metal oxide semiconductor field effect transistor (MOSFET) and the second switch comprises a MOSFET.

36. The system of claim 30 wherein the first switch comprises a diode.

37. The system of claim 33 wherein the second switch comprises a diode.

38. The system of claim 1 further comprising a sensor coupled to sense at least one parameter of at least one of said AC voltage source; and said engine and wherein in response to sensing a parameter, said sensor provides a sensor signal at an output thereof; and wherein said SMR comprises:

a plurality of connections for receiving at least one phase winding output;

a rectifier having an output voltage port, at least one first diode and at least one second diode, a cathode of the at least one first diode coupled to an anode of a respective at least one second diode;

a circuit coupled to the output voltage port, said circuit comprising:

at least one reactive device having a first port and a second port coupled to an anode of the respective at least one second diode;

at least one switch having a control terminal, a first terminal coupled to the first port of a respective at least one reactive device and a second terminal coupled to a reference potential; and wherein said controller is provided having an input terminal coupled to the output of the sensor, and wherein the controller is adapted to control said at least one switch such that a respective at least one reactive element can be selectively coupled between each of a respective phase winding output and the reference potential when said ac voltage source reaches a predetermined rotational speed, such that conduction times for the plurality of first and second diodes are modified resulting in increased output power.

39. The system of claim 38 wherein said reactive device comprises a capacitor.

40. The system of claim 38 wherein said sensor senses at least one of:

an ac voltage source speed;

an ac voltage source fundamental electrical frequency;

an ac voltage source back emf; and a rectifier output voltage.

41. The system of claim 38 wherein the reference potential comprises at least one of:

the negative output terminal; and the positive output terminal.

* * * * *

UNITED STATES PATENT AND TRADEMARK OFFICE

CERTIFICATE OF CORRECTION

PATENT NO. : 6,912,142 B2 
DATED : June 28, 2005
INVENTOR(S) : Thomas A. Keim et al.

It is certified that error appears in the above-identified patent and that said Letters Patent is hereby corrected as shown below:

Title page,
Item [57], ABSTRACT,
Line 11, delete "switched mode" and replace it with -- switched-mode --.

Column 1,
Line 45, delete "wound field" and replace it with -- wound-field --.

Column 2,
Line 60, delete "pulse width" and replace it with -- pulse-width --.

Column 3,
Line 64, delete "above referenced" and replace it with -- above-referenced --.

Column 5,
Line 18, delete "switched mode" and replace it with -- switched-mode --.

Column 6,
Line 5, delete "The it present" and replace it with -- The present --.
Line 17, delete "wound field" and replace it with -- wound-field --.
Line 39, delete "switch mode" and replace it with -- switch-mode --.

Column 8,
Line 60, delete "abase" and replace it with -- a base --.

Column 9,
Line 47, delete "greater that" and replace it with -- greater than --.

Column 11,
Line 44, delete "is for example the" and replace it with -- is, for example, the --.
Line 52, delete "correspond to" and replace it with -- corresponds to --.

Column 13,
Lines 35-36, delete "signal 102 and will be" and replace it with -- signal 102 will be --.

Column 14,
Line 12, delete "can for example" and replace it with -- can, for example, --.
Line 55, delete "the base duty ratio duty ratio of" and replace it with -- the base duty ratio of --.

Column 16,
Lines 14-15, delete "provided for example from" and replace it with -- provided, for example, from --.

UNITED STATES PATENT AND TRADEMARK OFFICE

CERTIFICATE OF CORRECTION

PATENT NO. : 6,912,142 B2
DATED : June 28, 2005
INVENTOR(S) : Thomas A. Keim et al.

It is certified that error appears in the above-identified patent and that said Letters Patent is hereby corrected as shown below:

Column 17,
Lines 1-2, delete “plurality output” and replace it with -- plurality of output --.
Lines 32-33, delete “are the coupled” and replace it with -- are then coupled --.

Column 18,
Lines 2-3, delete “controller 36” and replace it with -- controller 36” --.
Line 65, delete “switching element” and replace it with -- switching elements --.

Column 19,
Lines 31 and 35, delete “controller 36” and replace it with -- controller 36” --.
Lines 57-58, delete “As an example four” and replace it with -- As an example, four --.

Column 20,
Lines 54-55, delete “switching element” and replace it with -- switching elements --.

Column 22,
Line 24, delete “for a switches” and replace it with -- for switches --.
Line 39, delete “In the” and replace it with -- in the --.
Line 48, delete “describe” and replace it with -- described --.

Column 23,
Line 50, delete “168a-168a” and replace it with -- 168a-168c --.

Column 24,
Line 48, delete “diodes 186a” and replace it with -- diodes, 186a --.
Lines 55-56, delete “arrangements FIGS. 14A-14C.” and replace it with -- arrangements of FIGS. 14A-14C. --.

Column 25,
Lines 42-43, delete “current voltage” and replace it with -- current (ac) voltage --.

Column 26,
Line 40, delete “controllably” and replace it with -- controllable --.

Column 27,
Line 11, delete “controllably” and replace it with -- controllable --.

Column 28,
Lines 49, 56, 60 and 67, delete “switched mode” and replace it with -- switched-mode --.

UNITED STATES PATENT AND TRADEMARK OFFICE

CERTIFICATE OF CORRECTION

PATENT NO. : 6,912,142 B2
DATED : June 28, 2005
INVENTOR(S) : Thomas A. Keim et al.

It is certified that error appears in the above-identified patent and that said Letters Patent is hereby corrected as shown below:

Column 29,
Delete lines 20-21.

Signed and Sealed this

Thirteenth Day of June, 2006

JON W. DUDAS
*Director of the United States Patent and Trademark Office*